United States Patent [19]

Nagano et al.

[11] Patent Number: 5,724,388
[45] Date of Patent: Mar. 3, 1998

[54] DIGITAL SIGNAL MODULATION ANALYSIS DEVICE

[75] Inventors: Masao Nagano, Fukiage-machi; Hitoshi Takahashi, Gyoda, both of Japan

[73] Assignee: ADVANTEST Corp., Tokyo, Japan

[21] Appl. No.: 427,104

[22] Filed: Apr. 21, 1995

[30] Foreign Application Priority Data

Apr. 22, 1994 [JP] Japan .................................. 6-107940

[51] Int. Cl.$^6$ .............................. H04B 3/46; H04J 17/00
[52] U.S. Cl. .................. 375/224; 375/316; 375/228; 370/17
[58] Field of Search .................... 375/224, 316, 375/228; 370/19, 17; 455/315

[56] References Cited

U.S. PATENT DOCUMENTS

| | | | |
|---|---|---|---|
| 4,689,806 | 8/1987 | Von der Embre | 375/111 |
| 4,736,390 | 4/1988 | Ward et al. | 455/315 |
| 5,142,553 | 8/1992 | Rosenkranz | 375/75 |
| 5,416,802 | 5/1995 | Ishii | 375/316 |
| 5,475,709 | 12/1995 | Futagami et al. | 375/224 |

*Primary Examiner*—Stephen Chin
*Assistant Examiner*—Mohammad Ghayour
*Attorney, Agent, or Firm*—Muramatsu & Associates

[57] ABSTRACT

A digital signal modulation analysis device is to shorten the time for modulation analysis, and at the same time to structure a measurement device that is small in scale and inexpensive. A digital signal modulation analysis device includes a frequency converter which converts a signal from a device under test to a first intermediate frequency signal, a sampling part which converts the first intermediate frequency signal to a second intermediate-frequency signal whose frequency is lower than that of the first intermediate frequency to store the second intermediate frequency signal in a memory, a Hilbert converter which converts an incoming signal into orthogonal component signals through a quadrant-modulate detection process, an initial synchronization part which determines a carrier center frequency, a symbol-demodulation/parameter-estimation part which determines optimal parameters to minimize a modulation error and demodulates all symbol data to determine reference data for the all symbol data, and a modulation-precision calculation component which calculates modulation-precision data and modulation-error data for each symbol.

2 Claims, 15 Drawing Sheets

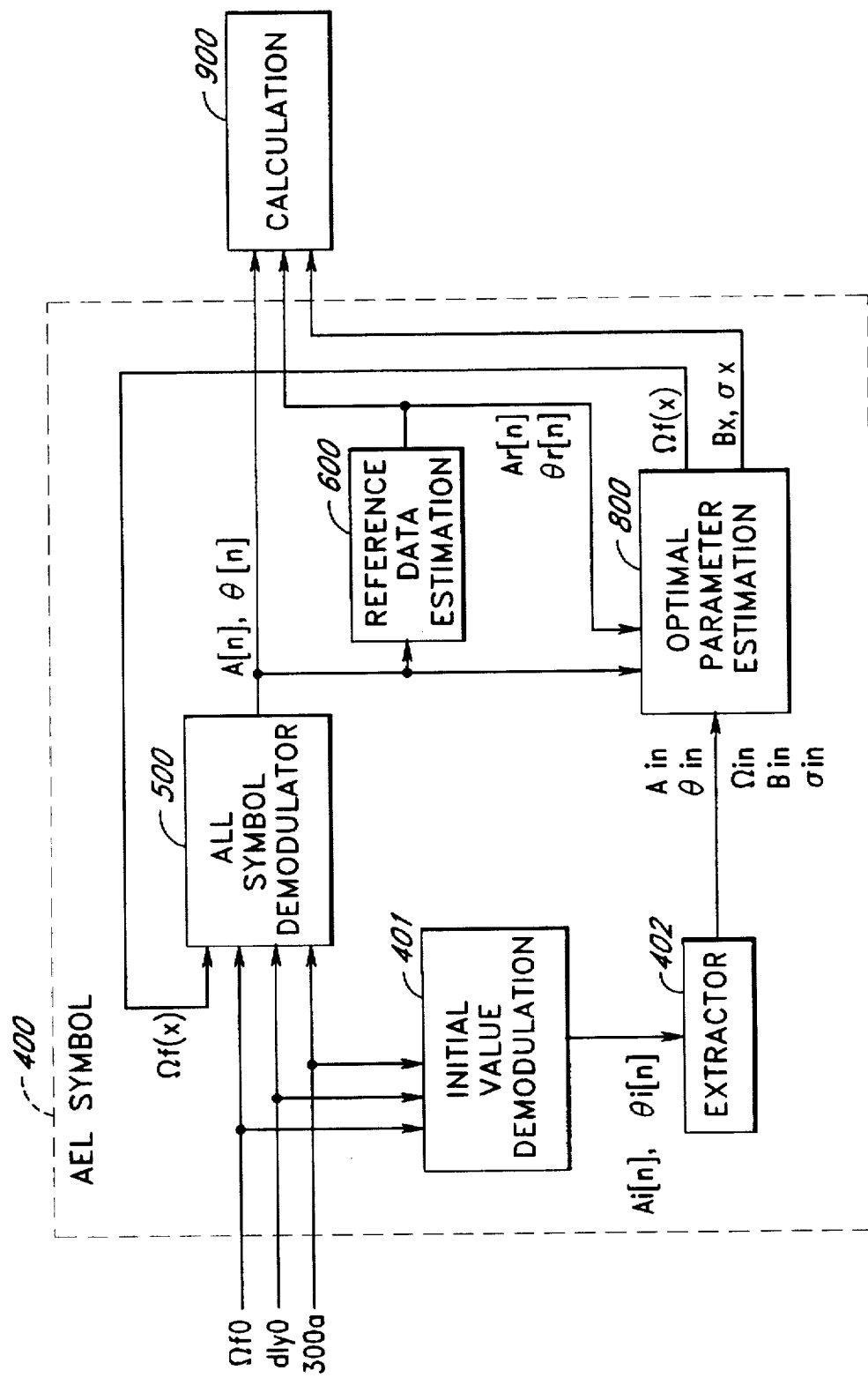

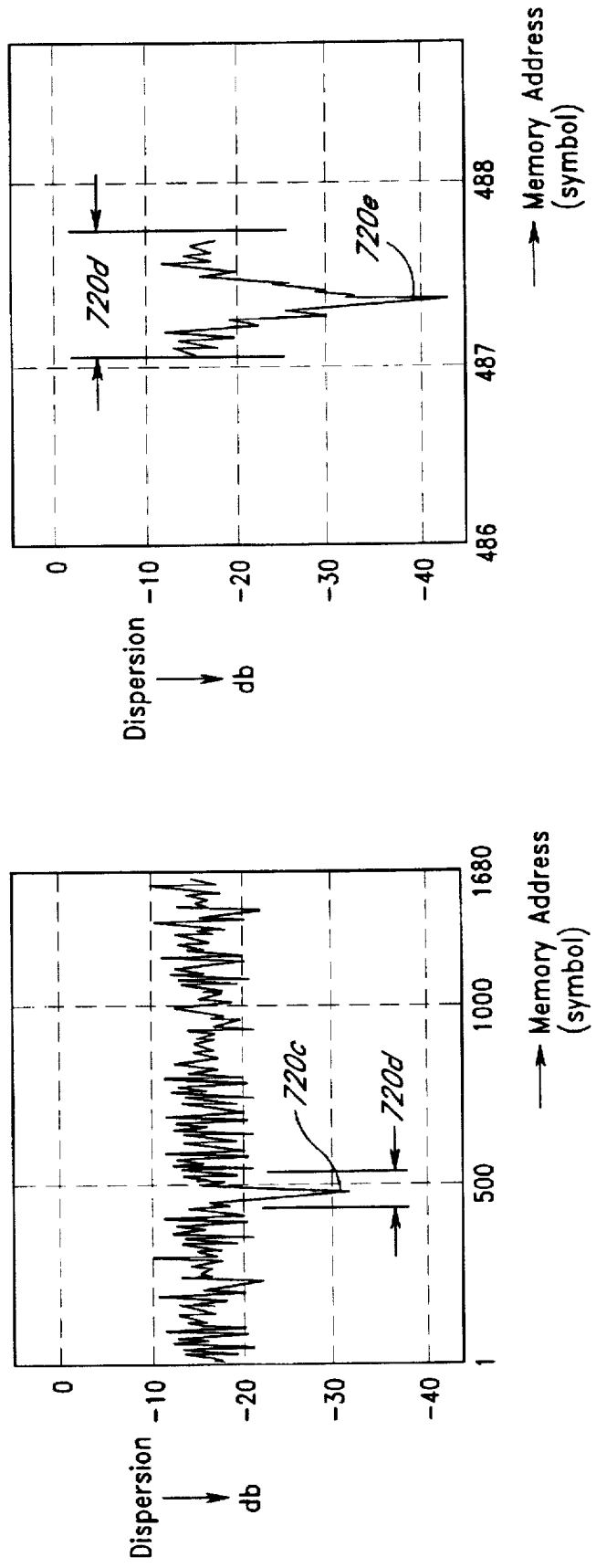

Sync Symbol

| Sub Channel 1 | | Sub Channel 2 | | Sub Channel 3 | | Sub Channel 4 | |
|---|---|---|---|---|---|---|---|
| Symbol No. | Phase | Symbol No. | Phase | Symbol No. | Phase | Symbol No. | Phase |
| 1 | -101.25 | 1 | +123.75 | 1 | -123.75 | 1 | +101.25 |
| 2 | -56.25 | 2 | -78.75 | 2 | +78.75 | 2 | +56.25 |
| 3 | +168.75 | 3 | -101.25 | 3 | +101.25 | 3 | -168.75 |

Pilot Symbol (Falling Main-Slot)

| Sub Channel 1 | | Sub Channel 2 | | Sub Channel 3 | | Sub Channel 4 | |
|---|---|---|---|---|---|---|---|
| Symbol No. | Phase | Symbol No. | Phase | Symbol No. | Phase | Symbol No. | Phase |
| 6 | -33.75 | 10 | -135.00 | 10 | +11.25 | 6 | +22.50 |
| 14 | +146.25 | 18 | +45.00 | 18 | -168.75 | 14 | -157.50 |
| 22 | -33.75 | 26 | -135.00 | 26 | +11.25 | 22 | +22.50 |
| 30 | +146.25 | 34 | +45.00 | 34 | -168.75 | 30 | -157.50 |
| 38 | -33.75 | 42 | -135.00 | 42 | +11.25 | 38 | +22.50 |
| 46 | +146.25 | 50 | +45.00 | 50 | -168.75 | 46 | -157.50 |
| 54 | -33.75 | 58 | -135.00 | 58 | +11.25 | 54 | +22.50 |

Pilot Symbol (Rising Main-Slot)

| Sub Channel 1 | | Sub Channel 2 | | Sub Channel 3 | | Sub Channel 4 | |
|---|---|---|---|---|---|---|---|
| Symbol No. | Phase | Symbol No. | Phase | Symbol No. | Phase | Symbol No. | Phase |
| 6 | -11.25 | 10 | +146.25 | 10 | -67.50 | 6 | +101.25 |
| 14 | +168.75 | 18 | -33.75 | 18 | +112.50 | 14 | -78.75 |
| 22 | -11.25 | 26 | +146.25 | 26 | -67.50 | 22 | +101.25 |
| 30 | +168.75 | 34 | -33.75 | 34 | +112.50 | 30 | -78.75 |
| 38 | -11.25 | 42 | +146.25 | 42 | -67.50 | 38 | +101.25 |
| 46 | +168.75 | 50 | -33.75 | 50 | +112.50 | 46 | -78.75 |
| 53 | -146.25 | 53 | +101.25 | 53 | +168.75 | 53 | -168.75 |

Pilot Symbol

| Sub Channel 1 | | Sub Channel 2 | | Sub Channel 3 | | Sub Channel 4 | |
|---|---|---|---|---|---|---|---|
| Symbol No. | Phase | Symbol No. | Phase | Symbol No. | Phase | Symbol No. | Phase |
| 6 | -11.25 | 10 | +146.25 | 10 | -67.50 | 6 | +101.25 |
| 14 | +168.75 | 17 | +101.25 | 17 | -78.75 | 14 | -78.75 |
| 20 | -33.75 | 20 | -101.25 | 20 | +11.25 | 20 | +78.75 |

FIG. 16

FIG. 17A  FALLING MAIN-SLOT
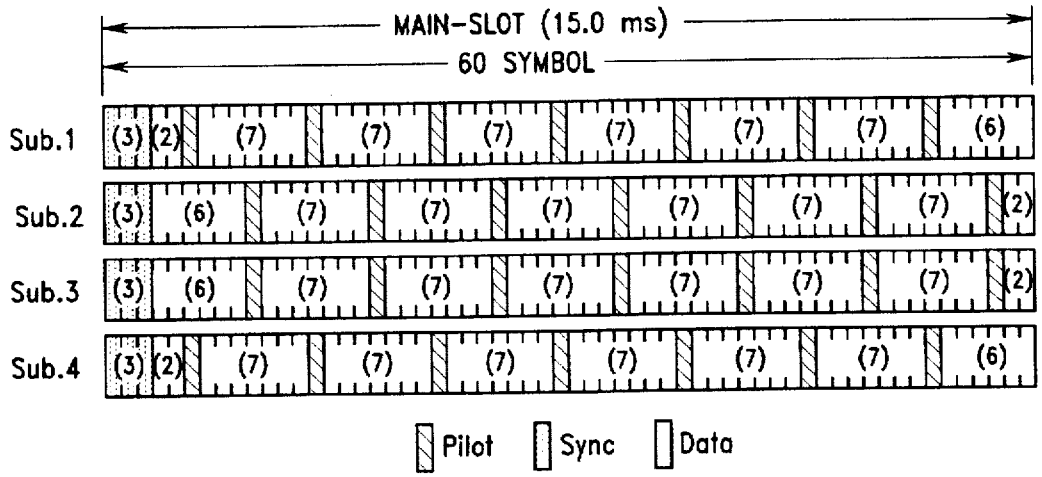
FIG. 17B  RISING MAIN-SLOT
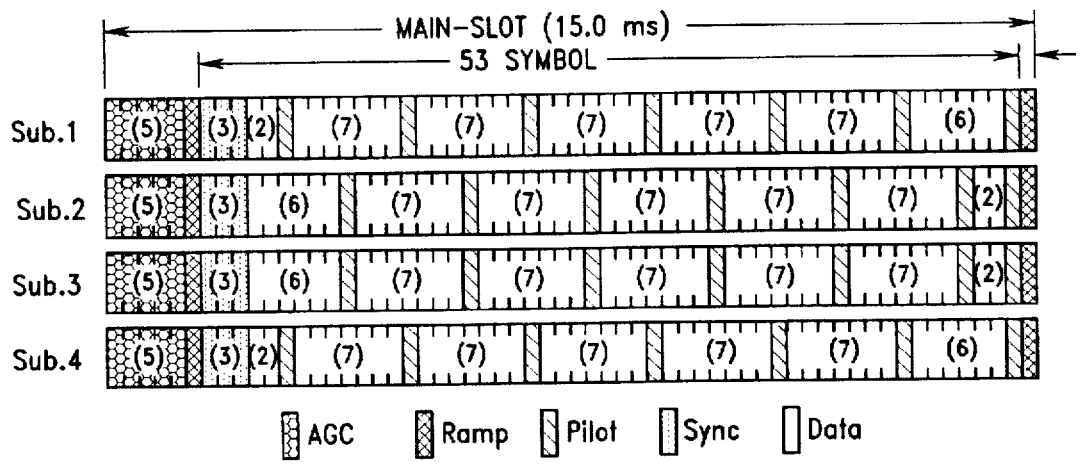
FIG. 17C  RISING SUB-SLOT
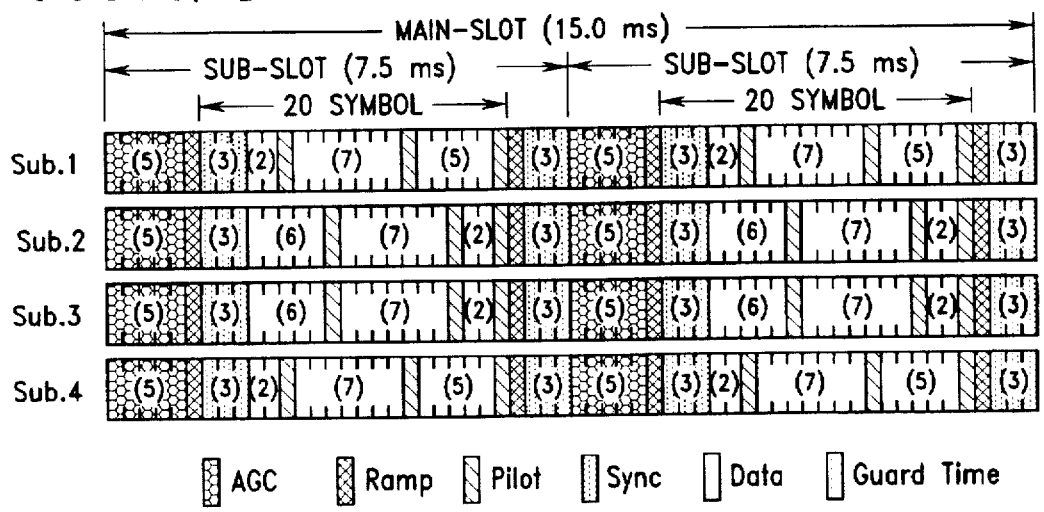

DIGITAL SIGNAL MODULATION ANALYSIS DEVICE

FIELD OF THE INVENTION

This invention is related to the modulation measurement of the digital signals used in digital communication methods, such as digital multichannel access (DMCA).

BACKGROUND OF THE INVENTION

In a digital communication system such as a private mobile communication system, which is M16QAM (multi-subcarrier 16 quadrature amplitude modulation, M=4), one of a DMCA modulation method is being used. The M16QAM transmits the 16QAM signal by using the multicarrier method, in which four subcarriers perform the transmissions at the same time. This communication method enables the transfer speed of 4K symbols/second for 64K bps (bits/second) data. "Digital Method MCA System Standard Regulations (RCR-STD-32)" is a document issued by the Electric Wave System Development Center Foundation, which discusses this subject. In this document the details of the modulation method, encoding method, sync/pilot insertion, fall/rise slot structural diagram, measurement method, and modulation-precision definitions are given.

The data is encoded in 16-bit units and then transmitted as shown in FIG. 14. This 16-bit data is split into four 4-bit segments and transmitted by the four subcarriers, ch. 1–4. Each subcarrier compresses the bandwidth using the roll-off=0.2 root Nyquist filter (bandwidth-compression filter). The interval between two subcarriers is 4.5 KHz, and 18 KHz of bandwidth is used for the four channels. The four-channel subcarrier transmission system diagram is shown in FIG. 15 for reference.

The 4-bit unit data is split into two bits of I-component and two bits of Q-component as shown in FIG. 12. By orthogonally encoding these bits, the 4-bit data is expressed in 16-value encoded combinations. This symbol will hereinafter be referred to as the "reference information symbol (RIS)." Besides the data symbols, on the transmission side a sync symbol and pilot symbol are inserted in the specified symbol number positions for each subchannel, as shown in FIG. 17. This reference sync/pilot symbol (reference pilot symbol, RPS) is placed on the √18 circumference as having a constant amplitude value as shown in FIG. 12. And as shown in FIG. 16, a standardized phase angle is given for each symbol number. From this and the I components and Q components on a receiving end side, the demodulation of the sync/pilot data and information symbols become possible. Normally, when demodulation is performed on the reception side, there are errors for the information symbols (IS) and sync/pilot symbols (PS), in that they are off in comparison to the reference-symbol points.

The slot structure is based on 15 millisecond time, as shown in FIG. 17. For the falling main slot structure, the structure is comprised of 60 symbols. The 60 symbols are comprised of three sync symbols, seven pilot symbols, and 50 information symbols. In the rising main slot structure it is comprised of 53 symbols, an AGC preamble and a ramp. The 53 symbols are comprised of three sync symbols, seven pilot symbols, and 43 information symbols. In the rising subslot structure it is comprised of 20 basic slot symbols, an AGC preamble and a ramp. The 20 symbols are comprised of three sync symbols, three pilot symbols, and 14 information symbols. As shown in FIG. 16, the number is counted up with the head slot symbol as symbol number one, and the phase angles for these sync and pilot symbols are set for each sync and pilot number.

The frame structure is based on a 90 millisecond time, with six-slots as the basic unit. This is used for the six-channel multiple time division, multiple-access communication, or TDMA (time division multiple access).

The following is the modulation error ε calculation method 31:

$$\epsilon = \frac{\sqrt{\frac{1}{N}\sum_{i=1}^{N}|Vmi\alpha\exp[j\phi] - Vri - V0|^2}}{r0} \quad \text{Formula 31}$$

The modulation precision for this digital communication method is defined in the formula for the modulation error calculation method 31. In the formula the variables are as follows: i=observed vector number, N=total observed vectors, r0=maximum radius (√18) of the signal-space diagram, Vmi=i-th observed vector, Vri=reference vector of the i-th observed vector, V0=origin-offset vector, α=gain parameter (scalar), and φ=phase parameter (scalar). The parameters V0, α and φ should be selected to minimize the modulation precision ε. The modulation error ε in FIG. 13 indicates the modulation error for the i-th observed vector.

The actual implementation example is described by referencing FIGS. 10 and 11, for the DMCA modulation precision measurements.

The structure for this device is comprised of a digital conversion component 190, signal generator 183, workstation 184, and analysis software 170, as shown in FIG. 10. This digital-conversion component 190 is comprised of frequency converter 192, Low Pass Filter (LPF) 193, AD converter 194, buffer memory 195, controller 196, and GPIB interface 197. The analysis software 170 is comprised of a channel separator 182, IQ conversion component 173a–173d, root Nyquist filter component 174a–174d, clock-estimation component 175a–175d, carrier-offset estimation component 176a–176d, and modulation-precision error-operation component 177, as shown in FIG. 11.

The measurement signal 191 from the device is under test input to the frequency converter which is also provided with signals from the high-precision signal generator 183 for the other input. After converting to the desired intermediate frequency, for example 100 KHz, and passing the low frequency signals with the next low-pass filter LPF193, the signals are supplied to the AD converter 194.

The AD converter 194 receives the signals, converts the signals into 12-bit digital signals, and stores them to the buffer memory 195. The memory capacity is 1M word, and it can store multiple 90 millisecond frames. The sampling and storage for this AD converter 194 is executed and controlled from the commands received by the controller 196 from the GPIB interface 197. The sampled data is transferred to the memory in the workstation 184 from the buffer memory 195 via GPIB interface 197. Modulation precision is attained by executing the analysis process to the transferred DMCA data.

On the workstation side, the above transferred data is received and analysis processing is executed using the analysis software 170.

The channel separator 172 converts the DMCA data using the high-speed Fourier transform (FFT) to the data on the frequency axis, then separates the M16QAM signals to four-channel subchannel signals (16QAM). Next, each of the IQ conversion components 173a–173d converts the M16QAM signals orthogonally into IQ signals for each channel.

Each of the route Nyquist filter component 174a–174d receives these signals and performs route Nyquist filter processing with the roll-odd rate 0.2, then supplies the signals to the clock estimation component 175a–175d.

Each of the clock-estimation component 175a–175d receives these IQ signals and performs a non-linear processing to each subchannel IQ signal to obtain the modulation-signal clock-frequency spectrum. From this spectrum, the estimation of the clock frequency and phase is performed.

Since the symbol points are already determined (as described above), the carrier offset estimation component 176a–176d estimates the carrier offset per burst from the predetermined phase and phase differences of the symbol points of the sync and pilot symbols.

The modulation-precision error-calculation component 177 calculates the vector from the symbol points described above. The vector error, clock alignment error, and carrier frequency offset can be calculated with the error vector from the reference vector points shown in FIG. 13. From this error data the vector-error bandwidth, phase waveform, vector-error FFT, eye pattern, constellation, etc., are displayed on the screen.

In actualizing the method with the above-described structure there were inconveniences such as the slow processing speed due to the calculations for FFT calculation processing, etc., being performed by the generic workstation CPU. And because large quantities of AD conversion data are transferred directly to GPIB, which takes time, the processing time can only be measured in minute units each time. Also, the signal generator 183 and workstation 184 would be required externally so the system structure becomes large in scale and expensive.

SUMMARY OF THE INVENTION

The problem this invention tries to resolve is to perform modulation-signal analysis in a short time, and also to structure a small-scale and inexpensive measurement device.

FIG. 1 shows the first resolution method with this invention.

In order to resolve the above issue, the structure for this invention receives the DUT signals, then sets up a frequency converter 109 to convert the signals to a constant, intermediate frequency. Then it receives the signals from the frequency converter 109 and converts the signals further to lower intermediate frequency signals. Then a sampling component 250 is set up to store the signals to memory. It sets up a Hilbert converter 310 to detect and convert the signals to I components and Q components. The I and Q components are received by an initial sync component 740 is to obtain the carrier central frequency $\Omega f0$ and slot sync address dly0.

The initial sync component 740 signals and I and Q component signals are received to calculate the optimal parameters (gain constant Ax, initial phase θx, carrier frequency $\Omega$x, and burst droop factor σx) to minimize the modulation error ε. Also, the demodulation data for all symbols (amplitude value A[n] for symbol number n, and the phase angle θ[n]), are demodulated. A complete symbol-demodulation/parameter estimation component 400 is set up to specify the reference data (amplitude value Ar[n] for reference symbol, and phase angle value θr[n] for the reference symbol) for all symbols. All symbol demodulation/parameter-estimation component 400 signals are received, and a modulation-precision calculation component 900 is set up to calculate the modulation- precision ε data and modulation-error data for each symbol.

Using this method, the digital MCA signals output by the DUT in the digital communication system can be measured for modulation precision.

FIG. 9 shows the second resolution method in this invention.

In order to resolve the above problem, the structure of this invention receives the DUT signals within the spectrum analyzer 110, and sets up the frequency converter 111 to convert the signals to set intermediate-frequency signals.

The measurement component 200 receives the frequency-converted signals from the spectrum analyzer 110. The signals are further converted to low intermediate- frequency signals, then passed through an AD converter. Sampling component 250 is set up to store these signals in memory. The Hilbert converter 310 is set up to convert the signals to I- and Q-components by quadrant-modulation detection. Initial sync component 740 is set up to obtain the carrier central frequency $\Omega$ f0 and slot sync address dly0. Then the initial sync component 740 signals and I- and Q-component signals are received to calculate the optimal parameters (gain constant Ax, initial phase θx, carrier frequency $\Omega$x, and burst droop factor σx) to minimize the modulation error ε. Also, the demodulation data for all symbols (amplitude value A[n] for symbol number n and phase angle θ[n]) are demodulated. A complete symbol-demodulation/parameter estimation component 400 is set up to specify the reference data (amplitude value Ar[n] for reference symbols, and phase angle value θr[n] for the reference symbol) for all symbols. All symbol-demodulation/parameter estimation component 400 signals are received, and modulation- precision calculation component 900 is set up to calculate the modulation-precision ε data and modulation-error data for each symbol.

The signals from the measurement component 200 are received by the spectrum analyzer 110, and the display controller 115 is set up to convert these signals to the modulation-error screen display data.

Using this method, the digital MCA signals output by the DUT in the digital communication system can be measured for modulation precision.

The calculation method for the optimal parameter estimation uses the initial values Ain, θin, $\Omega$in, Bin, and σin to perform the calculations at high speed by approximation.

The carrier's central-frequency detection component 700 in the initial sync component 740 obtains the approximate value of the carrier central-frequency $\Omega$. By using this method, even if there is an ±10 KHz error, for instance, there will not be any problems and the symbol modulation and optimal parameter estimations can be carried out normally.

The frequency-error detection component 760 of the initial sync component 740 receives the approximate value of the carrier central frequency value $\Omega$, and a more accurate carrier central frequency $\Omega f0$ can be obtained.

BRIEF DESCRIPTION OF THE DRAWINGS

FIG. 2 (b) shows the structural diagram of the Hilbert converter 304 in the Hilbert converter 310 for this invention.

FIG. 3 (b) shows the structural diagram of the carrier central frequency detection component 700 for this invention.

FIG. 3 (c) shows the structural diagram of IQ extraction component 710 for channel 1 for this invention.

FIG. 4 shows the structural diagram of the complete symbol-demodulation/parameter estimation component 400 for this invention.

FIG. 7 (b) is the vector-value transition diagram when there is a match with the basic slot.

FIG. 7 (c) is the vector-value transition diagram when there is a mismatch with the basic slot.

FIG. 7 (d) is the dispersion-transition diagram to describe the method to obtain the first coarse dispersion.

FIG. 7 (e) is the dispersion-transition diagram to describe the method to obtain the fine dispersion more precisely in a narrow region.

FIG. 16 is a diagram showing the slot structure under the standard specification and the nominal phase values for each sync/pilot symbol for every subchannel.

FIG. 17 is a diagram showing the slot structure under the standard specification and the symbol distribution for every subchannel.

DETAILED DESCRIPTION OF THE INVENTION

The description is given by referencing the first embodiment of this invention.

The first embodiment of this invention utilizes a frequency converter 109. The description is made by referencing FIGS. 1, 2(a)–(b), 3(a)–(c), 4, 5, 6, 7(a)–(e), and 8.

The system structure is described first.

Figure 1:
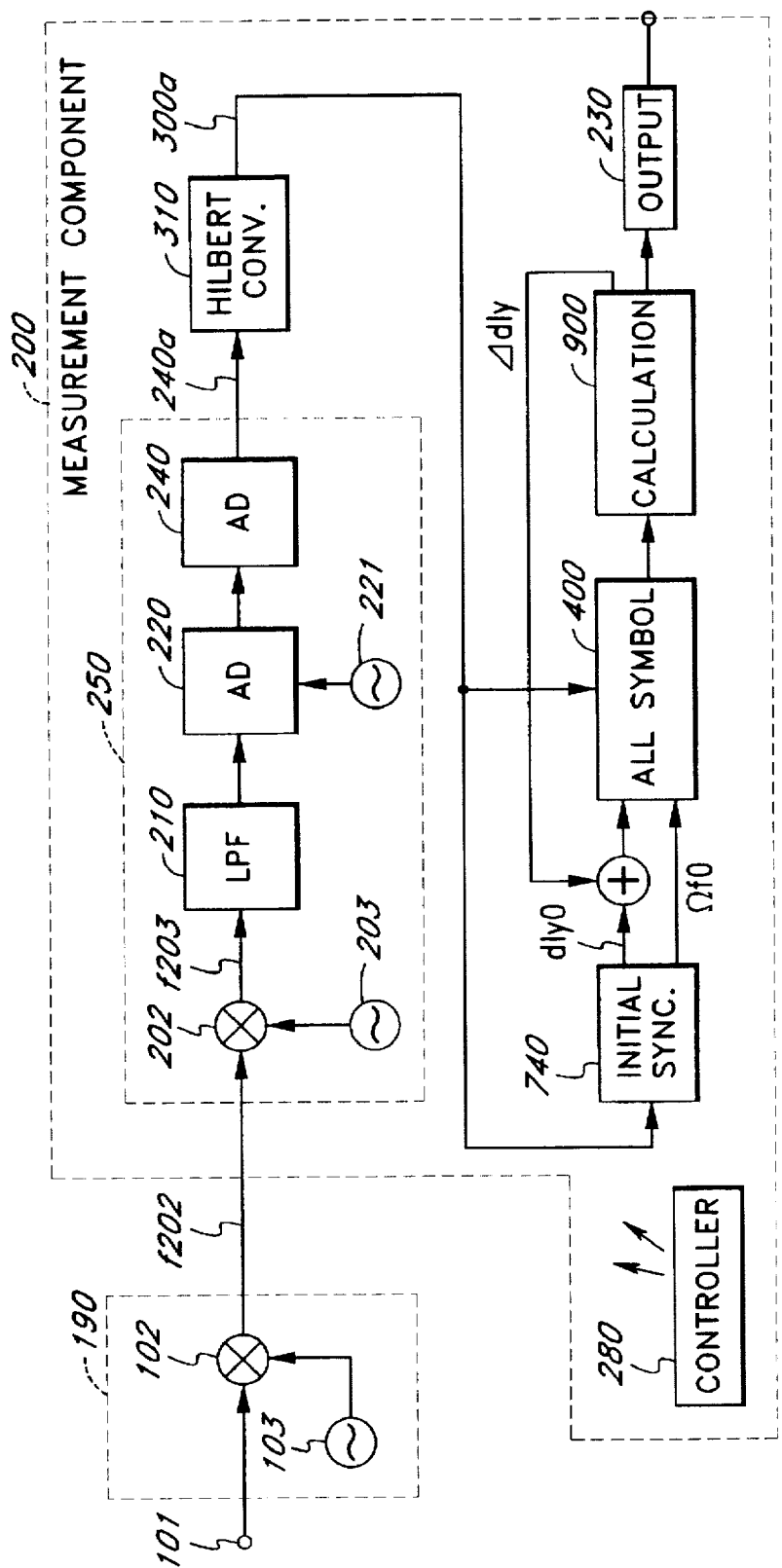
FIG. 1 shows the measurement component 200 digital modulation analysis device for the first embodiment of this invention.
Figure 2A:
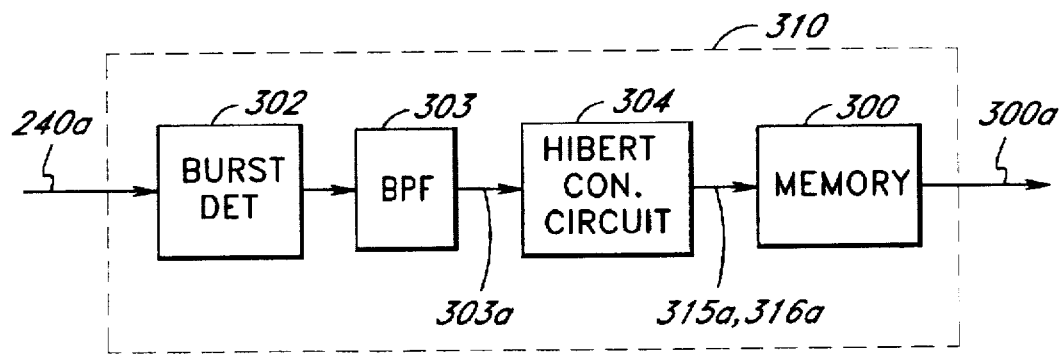
FIG. 2 (a) shows the structural diagram of the Hilbert converter 310 for this invention.
Figure 2B:
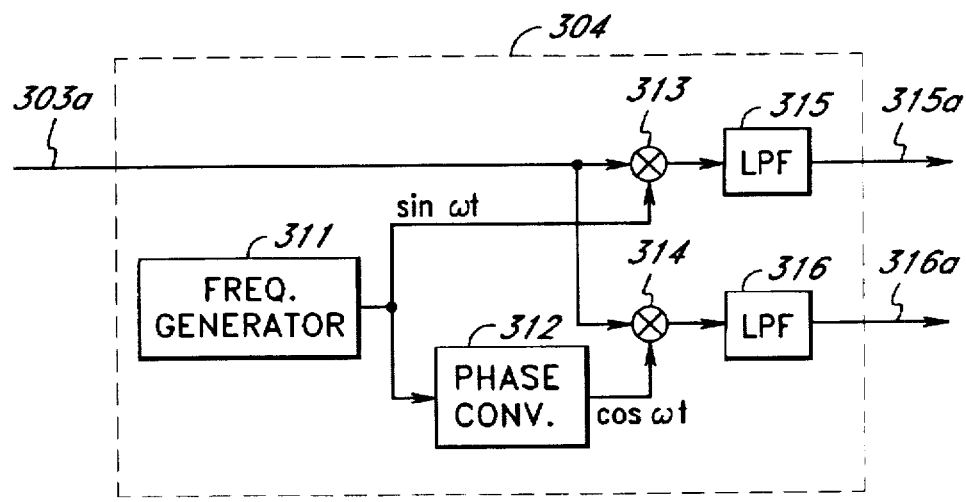

The system structure is comprised of the frequency converter 190 and a measurement component 200 as shown in FIG. 1. The frequency converter 190 is composed of a signal generator 103 and first mixer 102. The internal structure of the measurement component 200 is composed of a sampling component 250, Hilbert converter 310, initial sync component 740, complete symbol-demodulation/parameter-estimation component 400, modulation-precision calculation component 900, output component 230, and controller 280. The sampling component 250 is comprised of a second mixer 202, first oscillator 203, first LPF (low-pass filter) 210, AD converter 220, clock generator 221, and AD buffer memory 240.

Next, the operation outline for the modulation precision measurement as a whole is explained.

The frequency converter 109 converts the measurement signal 101 frequencies down to a predetermined frequency f202=21.42 MHz. For this, the signal generator 103 supplies the frequency signal to the first mixer 102 to change the frequency to the predetermined frequency f202. The first mixer receives signals from both the measurement signal 101 and signal generator 103, converts down to the specified frequency and supplies the signal f202 to the second mixer 202.

The second mixer 202 receives both the signal f202 and 21.2 MHz signals first oscillator 203, and converts down to 220 KHz signals. The output signal is supplied to the AD converter 220 after placing them through the low-pass filter LPF 210.

The AD converter 220 receives the 1008 KHz sampling clock from the clock generator 221 by the sampling command sent from the controller 280. After converting the received signal to 10-bit word data, the digital data is stored in the AD buffer memory 240. Since 1 symbol time is 4 KHz, the data is stored at 1008 KHz/4 KHz=252 words/symbol in the AD buffer memory.

There shall be storage capacity to store more than nine slot times in order to maintain a valid slot for the TDMA communication signals.

The above-described operations are performed by hardware circuits. The operations of the analyst processing described from this point on are performed by the software by sequentially reading the slot data. In this example, a DSP (digital signal processor) is used to speed up the analysis processing. Of course, a high speed CPU, etc., may be used instead of the DSP.

Next, the Hilbert converter 310 converts the 220 KHz intermediate-frequency signal digital data 240a read from the AD buffer 240 I and Q components through the quadrant-modulation process. Then the Hilbert converter 310 supplies the data converted into I and Q components (IQ data 300a) to the initial sync component 740 and complete symbol-demodulation/parameter-estimation component 400. The initial sync component 740 receives this IQ data 300a, obtains the carrier's central- frequency Ωf0 and slot sync address dly0 and supplies to the complete symbol-demodulation parameter estimation part 400. The complete symbol-demodulation/parameter estimation component 400, performs multiple estimation calculations internally, obtains the optimal parameters Ax, θx, Ωx, and σx to minimize the modulation error ε, and demodulates the complete symbol data to supply the resultant data to the calculation component 900. The modulation-precision calculation component 900 receives these data, calculates the modulation-precision error ε, modulation error for each symbol, and other data to provide the resulted data of the output component 230.

Here, there may be cases when we may want to confirm whether the modulation-precision error value ε from the slot starting address dly0, which was calculated in the initial sync component 740, is correct. In this case, change the slot starting address value to the position Δdly from the slot starting address dly0 and supply the changed address to the complete symbol- demodulation/parameter-estimation component 400 to calculate the modulation-precision error ε. The minimum modulation-precision error ε may be output instead.

The output component 230 processes and converts the received data to output-format data according to the analysis result information, and then outputs it externally. Total measurement control is performed by the controller 280.

The above-described outline is considered to be one cycle of the total measurement operation. The modulation-precision measurements by this measurement system are done by sampling the measurement signals 101 intermittently.

The total measurement-operation outline for modulation precision has been described. Next a detailed description of each section is given. The description for the controller 280 and sampling component 250 (composed of the frequency converter 109, second mixer 202, low pass filter oscillator 203, first LPF 210, AD converter 220, clock 221, and AD buffer memory 240) is omitted, since they can be easily understood through the operation outline described above. The items that will be described will be the Hilbert converter 310, initial sync component 740, complete symbol-demodulation/parameter-estimation component 400, modulation-precision calculation component 900, and output component 230.

First, a description of the Hilbert converter 310 will be given.

The internal structure of the Hilbert converter 310 is comprised of a burst detector 302, band pass filter BPF 303, Hilbert conversion circuit 304, and IQ storage memory 300, as shown in FIG. 2 (a).

The burst detector 302 retrieves the sequential slot data necessary for analysis and outputs it to the next stage. The 252 word/symbol-format data 240a stored in the AD buffer memory 240 is read and is output as valid data continuous over 2.4 slot time necessary for analysis. For TDMA communication signals, the signals are time-divided intermittent signals for every six slot time, so the valid slot data necessary for the analysis is detected from the nine-slot time data. The BPF 303 receives the above valid slot data, removes the unnecessary frequency contents by filtering and supplies the data to the Hilbert conversion circuit 304.

The internal structure of the Hilbert conversion circuit 304 is comprised of a first frequency generator 311, 90-degree phase shifter 312, third mixer 313, fourth mixer 314, third LPF 315, and fourth LPF 316, as shown in FIG. 2 (b).

The Hilbert converter 304 performs the quadrant-modulation detection to obtain the I/Q data. The received signals are converted to complex number signals having the actual number and the imaginary number through the Hilbert conversion, and the results are output to the next stage. To do this, the third mixer 313 receives the 220 KHz frequency signals 303a from BPF 303, and a 252 KHz sine signal $sin\omega t$. These signals are combined and converted to the quadrant modulate detection signals, and then output. The third LPF 315 receives these signals and outputs them as the I-components (or Q-components) after removing the high frequency components. The signal 315a is assumed to be I component data here.

The fourth mixer 314 receives the frequency signal 303a, and a 252 KHz cosine signal $cos\omega t$ where the phase of the 256 KHz signal 311 is shifted by 90 degrees using the 90-degree phase shifter 312. The fourth LPF 316 receives these signals and outputs them as the Q-component (or I-component) signals 316a after removing the high frequency components. Here, the signal 316a is assumed to be Q-component data. The I/Q component signals are intermediate frequency signals with 252 KHz−220 KHz=32 KHz.

The data is at 252 word/symbol format containing four-channel subcarrier data.

Next, the IQ storage memory 300 receives both output signals from the above Hilbert converter 304, and stores them in the memory. Later the initial sync component 740 and complete symbol demodulation/parameter-estimation component 400 will read this IQ data 300a for usage.

Next, the initial sync component 740 will be described.

The initial sync component 740 reads the IQ data 300a from the above-described IQ storage memory 300, calculates the carrier's central-frequency $\Omega f0$ and slot starting address dly0, and then outputs them.

Figure 3A:
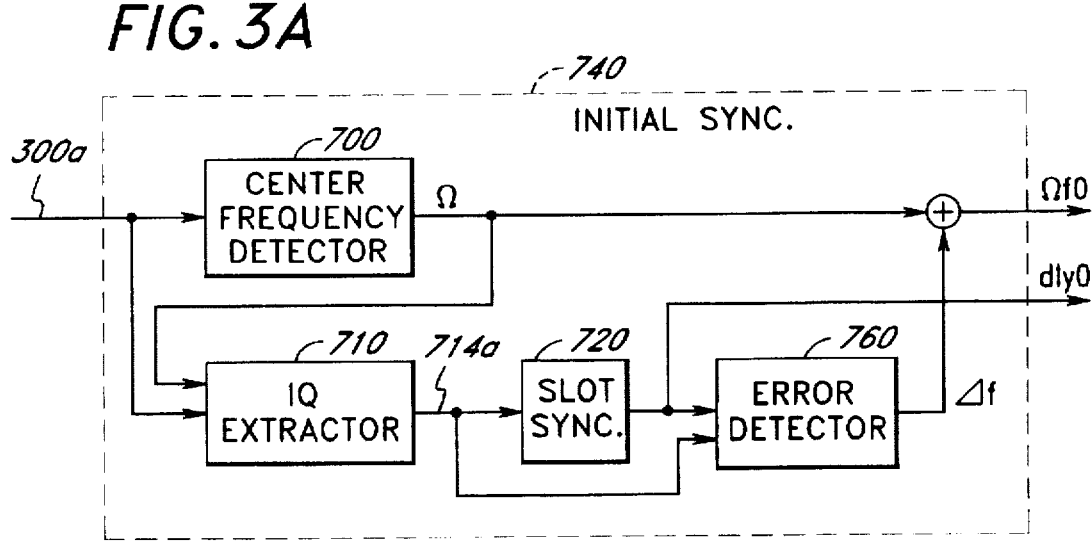
FIG. 3 (a) shows the structural diagram of the initial sync component 740 for this invention.

The internal structure of the initial sync component 740 is comprised of a carrier's central-frequency detector 700, IQ extractor 710 for channel 1, slot sync detector 720, and frequency-error detector 780, as shown in FIG. 3(a).

Figure 3B:
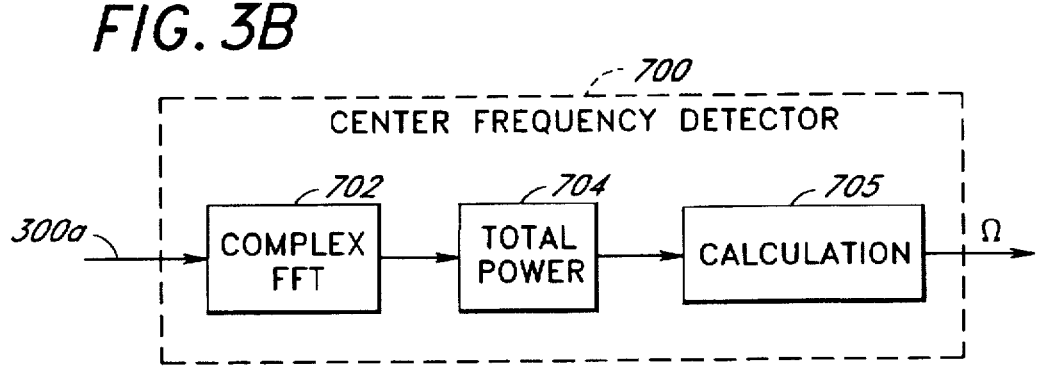

In order to obtain the approximate carrier central frequency Q, the carrier's central-frequency detector 700 is comprised of a complex FFT processing 702, total power calculation component 704 and carrier's central-frequency $\Omega$ calculation component 705, as shown in FIG. 3(b).

The calculation for the approximate carrier central frequency $\Omega$ uses a FFT-OBW carrier- frequency estimation method.

The complex FFT processing 702 reads the IQ data 300a from the IQ storage memory 300, and converts it to the frequency spectrum. Next, the total power calculation component 704 calculates the total power by obtaining the accumulated spectrum of this frequency component. Then, the carrier's central-frequency $\Omega$ calculation component 705 obtains the approximate carrier's central-frequency $\Omega$ as the halfway point of the total power frequency. The approximate center frequency is supplied to the IQ extractor 710.

The IQ extractor 710 receives the above-described carrier's central- frequency $\Omega$ and 32 KHz IQ data 300a, and generates IQ asynchronous output data 714a.

Figure 3C:
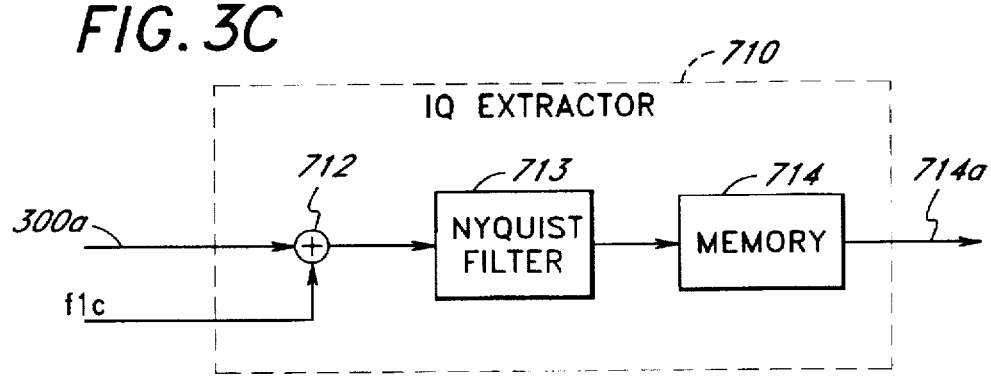

The internal structure of the channel 1 IQ extractor 710 is comprised of a fifth mixer 712, root Nyquist filter 713, and asynchronous output memory 714, as shown in FIG. 3(c).

The channel 1 subcarrier frequency is obtained by f1c= $\Omega$−6.75 KHz. The fifth mixer 712 receives this frequency f1c and 32 KHz IQ data 300a, converts to the channel base band signals by down-converting, then supplies this data to the root Nyquist filter 713. The root Nyquist filter 713 receives these signals and stores the filtered channel 1 output data in the asynchronous output memory 714. This channel 1 asynchronous output data 714a is read by the slot sync detector 720 and frequency error detector 760 for usage.

The slot sync detector 720 reads the above-described asynchronous output data 714a, detects the sync/pilot symbols (PS) from the data, and obtains the slot starting address dly0. In other words, the sync position of the slot is detected.

The slot starting address dly0 detection method performs the detection by first viewing the fact that the magnitude of the sync/pilot symbols (PS) are constantly on the $\sqrt{18}$ circumference, and secondly in viewing that each sync/pilot symbol (RPS) is placed at the set symbol-number position.

The description of this sync/pilot symbol (PS) detection is made for subchannel 1 in the 60 symbol falling slot structure for the one-slot structure. The sync/pilot symbols (PS) numbers for this case are 1, 2, 3, 6, 14, 22, 30, 38, 46, and 54.

First, the bandwidth distribution of the sync/pilot symbol points for one slot will be obtained. For this the address value for symbol number one is determined to be the starting point address dlyx for the starting address of the asynchronous output memory 714. The address value of the symbol number two will be the starting point address dlyx+252 since the data is stored by the unit of 252 word/symbol. The address value for each sync/pilot symbol point is obtained in a similar fashion.

Next, the above-described symbol amplitude value for each address value can be obtained by calculation using the read I and Q component data. If a true basic slot starting symbol address dly0 is used as shown with 720a points in the vector-value transition diagram in FIG. 7(b), the amplitude all exist on the same √18 amplitude, and the distribution is at a minimal value. On the other hand, if the value is off from the true basic slot starting symbol position, the points are dispersed from the √18 positions as shown in the 720b points in the vector-value transition diagram in FIG. 7 (c). The dispersion for this case would be a larger value.

In order to obtain the true slot starting address dly0, calculate the dispersion by increasing the starting point address position, then obtain the address position with the minimum dispersion from this dispersion data.

In this application data, it is performed by dividing the procedure into two parts in order to reduce the processing time. The first time, a coarse distribution is attained by reading the sample data address in +9 pitch intervals as shown in FIG. 7(d). From these dispersion value the smallest address value 720c can be obtained. The second time, a finer dispersion is obtained just for the region 720d including addresses before and after the smallest address value 720c. As a result the smallest dispersion address value 720c can be obtained. This address value can be used as the slot starting address dly0. This data is supplied to the frequency-error detection component 760 and complete symbol-demodulation/parameter estimation-component 400.

As a result of obtaining the slot sync, each sync/pilot symbol (RPS) nominal phase value and I-component data 315a and Q-component data 316, which has been assumed, is determined and finalized.

The frequency-error detection component 760 obtains the carrier's central-frequency error- frequency value Δf, and then outputs the true carrier's central-frequency Ωf0.

Figure 8:
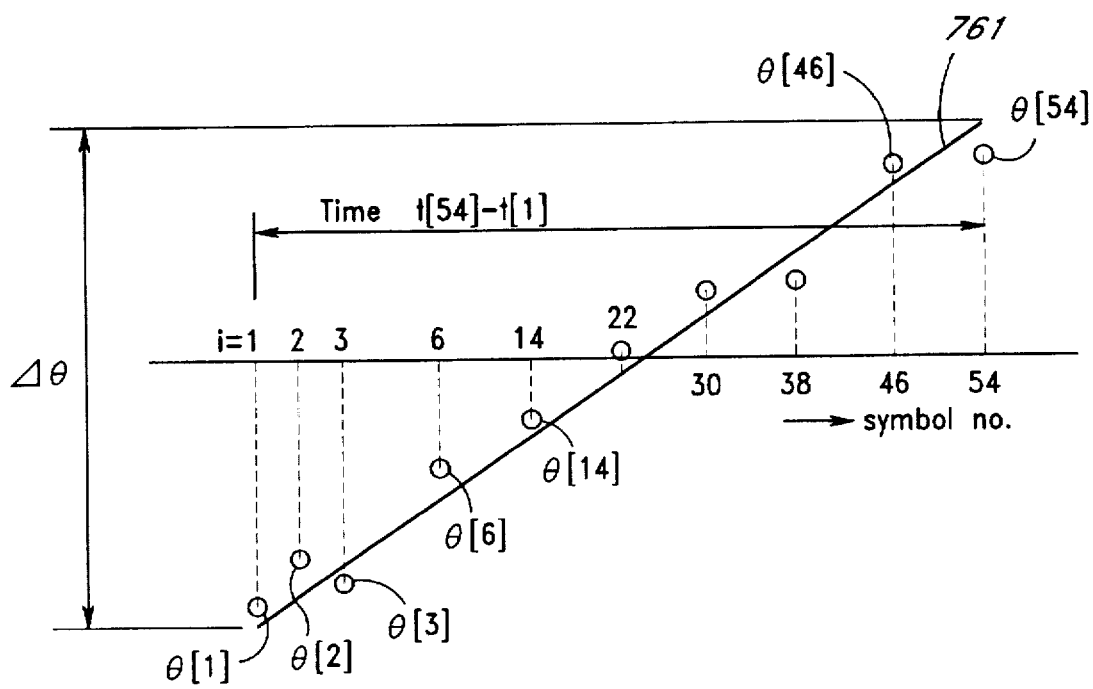
FIG. 8 is a diagram plotting the phase data subtracting the nominal phase value for each symbol.

To do this, the above-described slot starting address dly0 is received, read in I and Q component data of the sync/pilot symbols (PS) from the asynchronous output memory 714, and the phase angle is calculated for each symbol. The error phase-data θ[i] value for each symbol can be calculated from the difference taken between the above-mentioned calculated phase angle and nominal phase angle for each standard regulation symbol, shown in FIG. 16. When these points are plotted, the plotted diagram as shown in FIG. 8 can be obtained. Here, θ[i] means the i-th symbol phase angle, the difference from the nominal phase value. Since the data θ[i] is discrete, the phase line 761 is obtained by the calculation minimizing the dispersion (minimum square method). From the obtained phase line 761, the difference from the carrier's central-frequency Ω, or the error frequency Δf can be obtained with Δf=ε[(ΔΘ/(t[54]−t[1]))]. The true carrier's central-frequency Ωf0 can be obtained by Ω+Δf. This data is supplied to the complete symbol-demodulation/ parameter-estimation component 400.

Next, the complete symbol-demodulation/parameter-estimation component 400 is described.

The internal structure of the complete symbol-demodulation/parameter-estimation component is comprised of an all-channel sync IQ initial-value demodulation component 401, initial-value extractor 402, optimal-parameter estimation component 800, complete symbol-demodulation component 500, and reference-data estimation component 600.

The complete symbol-demodulation/parameter-estimation component 400 receives the slot starting address dly0 and carrier's central-frequency Ωf0 from the initial sync component 740. The IQ data 300a is read from the IQ storage memory 300, and Ax, Ωx, Bx, and σx are obtained to minimize the modulation precision ε. Total symbol-demodulation data A[n] and θ[n] are obtained to minimize the modulation precision ε. Total symbol-reference data Ar[n] and θr[n] are determined. This data is supplied to the modulation-precision measurement component 900. The "n" is the number of total symbols.

Before describing each section of the total symbol-demodulation/parameter-estimation component 400, the calculation method (1)–(23) for the parameters used to minimize the modulation precision ε is shown below. The calculation formulas (14), (15), (21), and (23) are used in the initial-value extractor 402 or optimal-parameter estimation component 800.

The symbol optimal-parameter calculation formulas (1)–(23) and procedures for the approximation calculation are described below.

The measurement-signal symbol coordinates are expressed as shown below:

$$a_{mes}(k)e^{j\theta_{mes}(k)} \tag{1}$$

The reference-signal symbol coordinates are expressed as shown below:

$$a_{ref}(k)e^{j\theta_{ref}(k)} \tag{2}$$

k=0, 1, . . . , N-1 (N is the number of symbols.) (For digital MCA, N=60.)

Now, the parameters $A_0$, $\sigma_0$, $\theta_0$, and $\Omega_0$ to minimize the following formula (3) are calculated.

$$\bar{\epsilon}^2 = \sum_k |A_0 e^{\sigma_0 k} e^{-j(\Omega_0 k + \theta_0)} \cdot a_{mes}(jk)e^{j\theta_{mes}(k)} - B_0 - a_{ref}(k)e^{j\theta_{ref}(k)}|^2 \tag{3}$$

The definition of each parameter is as shown below:

$A_0$: gain $\sigma_0$: droop factor $\theta_0$: phase error $\Omega_0$: frequency error $B_0$: IQ offset (complex number)

Assume that the IQ offset $B_0$ is "0" and calculate the other parameters to minimize the formula (3), then calculate $B_0$.

First, assume that $B_0$ is "0" and change the formula (3). Then formula (4) is obtained.

$$\bar{e}^2 = \sum_k a_{ref}^2(k)|e^{-j(\Omega_0 k - \theta_0 - \theta_{mes}(k))}|^2 \left| \frac{A_0 a_{mes}(k)e^{\sigma_0 k}}{a_{ref}(k)} - e^{j(\theta_{ref}(k)+\Omega_0 k+\theta_0+\theta_{mes}(k))} \right|^2 \quad (4)$$

$$= \sum_k A_0 a_{mes}(k) a_{ref}(k) e^{\sigma_0 k} \left[ \left( \frac{A_0 a_{mes}(k)e^{\sigma_0 k}}{a_{ref}(k)} \right) + \left( \frac{A_0 a_{mes}(k)e^{\sigma_0 k}}{a_{ref}(k)} \right)^{-1} - 2\cos(\theta_{ref}(k) + \Omega_0 k + \theta_0 - \theta_{mes}(k)) \right]$$

The approximation formula (5) when $x \cong 1$ $$X = \frac{1}{x} = e^{\ln x} + e^{-\ln x} \cong 2 + (\ln x)^2 \quad (5)$$

and the approximation formula (6) when $\theta_{ref}(k)+\Omega_0 k+\theta_0-\theta_{mes}(k) \cong 0$ are used, $$\cos(\theta_{ref}(k) + \Omega_0 k + \theta_0 - \theta_{mes}(k)) \cong \quad (6)$$

$$1 - \frac{1}{2}(\theta_{ref}(k) + \Omega_0 k + \theta_0 - \theta_{mes}(k))^2$$

the formula (4) becomes the following:

$$\bar{e}^2 = \sum_k A_0 a_{mes}(k) a_{ref}(k) e^{\sigma_0 k} \left[ \left( \ln \left( \frac{A_0 a_{mes}(k)e^{\sigma_0 k}}{a_{ref}(k)} \right) \right)^2 + (\theta_{ref}(k) + \Omega_0 k + \theta_0 - \theta_{mes}(k))^2 \right] \quad (7)$$

Here, when $a_0 = \ln A_0$, $A_{mes}(k) = \ln a_{mes}(k)$, $A_{ref}(k) = \ln a_{ref}(k)$, $d(k) = a_0 + \sigma_0 k + A_{mes}(k) - A_{ref}(k)$, $\Delta(k) = \theta_0 + \Omega_0 k + \theta_{ref}(k) - \theta_{mes}(k)$ is placed, formula (7) becomes the following:

$$\bar{e}^2 = \sum_k |d^2(k) + \Delta^2(k)|e^{a_0+\sigma_0 k+A_{mes}(k)+A_{ref}(k)} \quad (8)$$

$$= \sum_k |d^2(k) + \Delta^2(k)|e^{2A_{ref}(k)} \cdot e^{d(k)}$$

Assuming that d(k) and A(k) are small enough and ignoring the items third order or more, formula (9) is obtained:

$$\bar{e}^2 = \sum_k |d^2(k) + \Delta^2(k)|e^{2A_{ref}(k)} \quad (9)$$

$$= \sum_k |(a_0 + \sigma_0 k + A_{mes}(k) - A_{ref}(k))^2 +$$

$$(\theta_0 + \Omega_0 k + \theta_{ref}(k) - \theta_{mes}(k))^2|e^{2A_{ref}(k)}$$

Find $a_0$, $\sigma_0$, $\theta_0$, and $\Omega_0$ which would minimize formula (9). In other words, this can be obtained by placing zeros in the formula, which had been differentiated for each parameter, as shown in (10)–(13).

$$\frac{\partial \bar{e}^2}{\partial a_0} = 2\sum_k |a_0 + \sigma_0 k + A_{mes}(k) - A_{ref}(k)|e^{2A_{ref}(k)} = 0 \quad (10)$$

$$\frac{\partial \bar{e}^2}{\partial \sigma_0} = 2\sum_k k|a_0 + \sigma_0 k + A_{mes}(k) - A_{ref}(k)|e^{2A_{ref}(k)} = 0 \quad (11)$$

$$\frac{\partial \bar{e}^2}{\partial \theta_0} = 2\sum_k |\theta_0 + \Omega_0 k + \theta_{ref}(k) - \theta_{mes}(k)|e^{2A_{ref}(k)} = 0 \quad (12)$$

$$\frac{\partial \bar{e}^2}{\partial \Omega_0} = 2\sum_k k|\theta_0 + \Omega_0 k + \theta_{ref}(k) - \theta_{mes}(k)|e^{2A_{ref}(k)} = 0 \quad (13)$$

Formulas (10) and (11) are the simultaneous equations for $a_0$ and (=$1\ln A_0$). When solving for $A_0$ and $\sigma_0$, the following formula is obtained:

$$\begin{pmatrix} \ln A_0 \\ \sigma 0 \end{pmatrix} = - \left[ \left| \sum_k k e^{2A_{ref}(k)} \right|^2 - \left| \sum_k e^{2A_{ref}(k)} \right| \cdot \left| \sum_k k^2 e^{2A_{ref}(k)} \right| \right]^{-1} \quad (14)$$

$$\begin{pmatrix} -\sum_k k^2 e^{2A_{ref}(k)} & \sum_k k e^{2A_{ref}(k)} \\ \sum_k k e^{2A_{ref}(k)} & -\sum_k e^{2A_{ref}(k)} \end{pmatrix} \begin{pmatrix} \sum_k |A_{mes}(k) - A_{ref}(k)|e^{2A_{ref}(k)} \\ \sum_k k|A_{mes}(k) - A_{ref}(k)|e^{2A_{ref}(k)} \end{pmatrix}$$

Similarly, when solving for $\theta_0$ and $\Omega_0$ with formulas (12) and (13), the following formula is obtained:

$$\begin{pmatrix} \theta_o \\ \Omega_0 \end{pmatrix} = - \left[ \left| \sum_k k e^{2A_{ref}(k)} \right|^2 - \left| \sum_k e^{2A_{ref}(k)} \right| \cdot \left| \sum_k k^2 e^{2A_{ref}(k)} \right| \right]^{-1} \quad (15)$$

$$\begin{pmatrix} -\sum_k k^2 e^{2A_{ref}(k)} & \sum_k k e^{2A_{ref}(k)} \\ \sum_k k e^{2A_{ref}(k)} & -\sum_k e^{2A_{ref}(k)} \end{pmatrix} \begin{pmatrix} \sum_k |\theta_{ref}(k) - \theta_{mes}(k)|e^{2A_{ref}(k)} \\ \sum_k k|\theta_{ref}(k) - \theta_{mes}(k)|e^{2A_{ref}(k)} \end{pmatrix}$$

The four other parameters besides the IQ offset $B_0$ are calculated from formulas (14) and (15). Lastly, the IQ offset $B_0$ is obtained:

$X_{mes}(k) \equiv \text{Re}[A_0 e^{\sigma_0 k-j(\Omega_0 k+O_0)} \cdot a_{mes}(k) e^{j\,O_{mes}(k)}$ $Y_{mes}(k) \equiv \text{IM}[A_0 e^{\sigma_0 k-j(\Omega_0 k+O_0)} \cdot a_{mes}(k) e^{j\,O_{mes}(k)}]$ $X_{ref}(k) \equiv \text{Re}[a_{ref}(k) e^{jO_{ref}(k)}]$, $Y_{ref}(k) \equiv \text{IM}[a_{ref}(k) e^{jO_{ref}(k)}]$ $I_0 \equiv \text{Re}[B_0]$, $Q_0 \equiv \text{Im}[B_0]$ When the above values are placed, formula (3) becomes the following:

$$\bar{e}^2 = \sum_k |(X_{mes}(k) + jY_{mes}(k)) - (X_{ref}(k) + jY_{ref}(k)) - (I_0 + jQ_0)|^2 \quad (16)$$

$$= \sum_k ((X_{mes}(k) - X_{ref}(k) - I_0)^2 + (Y_{mes}(k) - Y_{ref}(k) - Q_0)^2)$$

The $I_0$ and $Q_0$ which would minimize formula (16) can be obtained by solving the following formula:

$$\frac{\partial \bar{e}^2}{\partial I_0} = 2\sum_k (X_{mes}(k) - X_{ref}(k) - I_0) = 0 \quad (17)$$

$$\frac{\partial \bar{e}^2}{\partial Q_0} = 2\sum_k (Y_{mes}(k) - Y_{ref}(k) - Q_0) = 0 \quad (18)$$

When k is set to be 0, 1, ..., N-1 (N is the number of symbols) and solved for $I_0$ and $Q_0$, the following is obtained:

$$I_0 = \frac{1}{N} \sum_k (X_{mes}(k) - X_{ref}(k)) \quad (19)$$

-continued $$Q_0 = \frac{1}{N} \sum_k (Y_{mes}(k) - Y_{ref}(k)) \quad (20)$$

Therefore, the following is obtained:

$$B_0 = \frac{1}{N} \sum_k [(X_{mes}(k) + jY_{mes}(k)) - (X_{ref}(k) + jY_{ref}(k))] \quad (21)$$

The modulation and demodulation for digital signals is mostly "0" for the droop factor $\sigma_0$ and IQ offset $B_0$, and they can be ignored. Thus when the optimal-parameter default values are estimated from the sync/pilot symbols, $\sigma_0$ and $B_0$ are ignored.

The formulas (10) and (11) for the $a_0$ and $\sigma_0$ become one formula (22):

$$\frac{\partial \overline{e^2}}{\partial a_0} = 2 \sum_k \ln a_0 + A_{mes}(k) - A_{ref}(k) |e^{2A_{ref}(k)} = 0 \quad (22)$$

When solving for $a_0$ (=ln$A_0$), $$\ln A_0 = -\frac{\sum_k |A_{mes}(k) - A_{ref}(k)|e^{2A_{ref}(k)}}{\sum_k e^{2A_{ref}(k)}} \quad (23)$$

The other parameters $\theta_0$ and $\Omega_0$ are the same as for formula (15).

In formulas (1)–(23), k was set to be {0, 1, ..., N-1} but k can be set as k=0, 1, 2, 6, 14, ... to limit the k to specific symbols to define the parameters more quickly.

First the all-channel sync IQ initial-value demodulation component 401 will be described.

Figure 5:
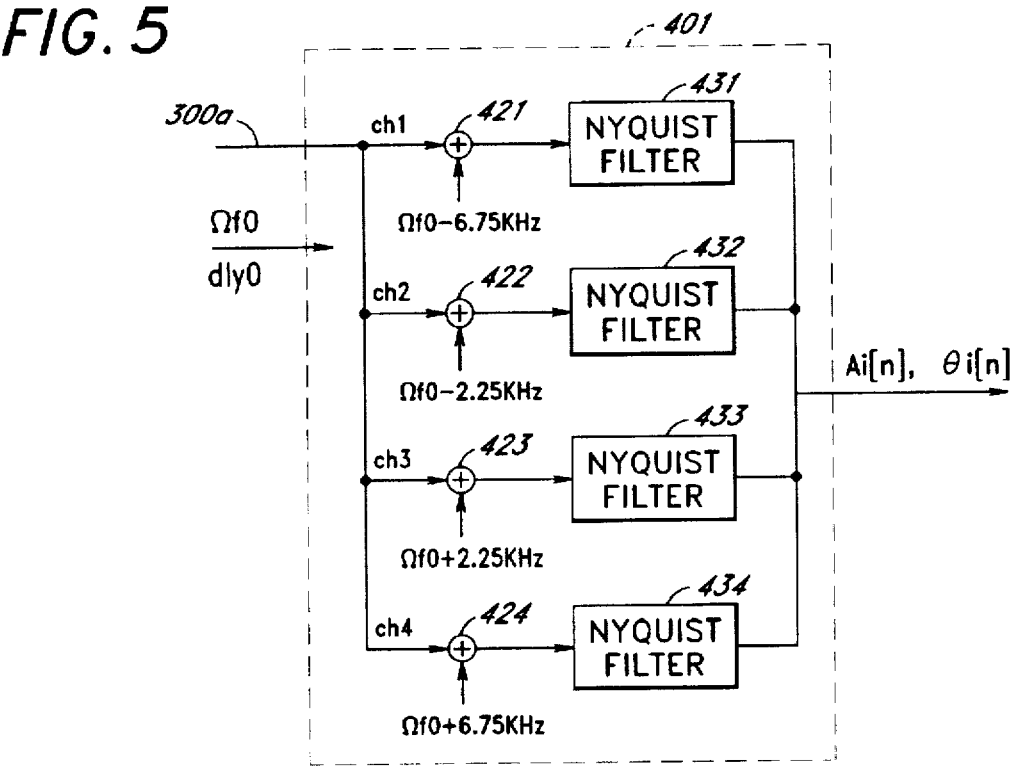
FIG. 5 shows the structural diagram of the sync IQ initial-value demodulation component 401 for all channels for this invention.

The structure of the all-channel sync IQ demodulation component 401 is comprised of a channel-one mixer 421, channel-two mixer 422, channel-three mixer 423, channel-four mixer 424, and root Nyquist filter 431–434, as shown in FIG. 5. Then the slot starting address dly0 and carrier's central-frequency $\Omega f0$ are received, and the IQ data 300a is read from the IQ storage memory 300. After converting this data to sync/pilot symbols (PS) for the four channels into I and Q components, the amplitude Ai[n] and phase angle $\theta$i[n] are demodulated.

In channel 1, with the $\Omega f0$–6.75 KHz frequency and 32 KHz IQ data 300a, down-convert the data into base band by the channel-one mixer 421. Then filter the data through the root Nyquist filter 431. Calculate the amplitude Ai[n] and phase angle $\theta$i[n] from the I and Q component data obtained, and supply this data to the default-value extractor 402.

Similarly in channel 2, with the $\Omega f0$–2.25 KHz frequency and 32 KHz IQ data 300a, down-convert the data into the base band by the channel-two mixer 422. Then filter the data through the route Nyquist filter 432. Calculate the amplitude Ai[n] and phase angle $\theta$i[n] from the I and Q component data obtained, and supply this data to the initial-value extractor 402.

Similarly in channel 3, with the $\Omega f0$+2.25 KHz frequency and 32 KHz IQ data 300a, down-convert the data into the base band by the channel-three mixer 423. Then filter the data through the root Nyquist filter 433. Calculate the amplitude Ai[n] and phase angle $\theta$i[n] from the I and Q component data obtained, and supply this data to the initial-value extractor 402.

Similarly, in channel 4, with the $\Omega f0$+6.75 KHz frequency and 32 KHz IQ data 300a, down-convert the data into the base band by the channel-four mixer 424. Then filter the data through the root Nyquist filter 434. Calculate the bandwidth Ai[n] and phase angle $\theta$i[n] from the I and Q component data obtained, and supply this data to the initial value extractor 402.

The initial-value extractor 402 receives amplitude Ai[n] and phase angle $\theta$i[n] (obtained above) of the sync/pilot symbols for each channel. Then, the initial value data Ain, $\theta$in, $\Omega$in, and $\sigma$in are calculated with the calculation formula (15) and (23).

Here, Ain is the gain constant, and the value is obtained by assuming the sync/pilot symbol (PS) is on $\sqrt{18}$. $\theta$in is the initial phase, and the nominal phase value for symbol number 1 in FIG. 16 is used. $\Omega$in is the initial carrier frequency, and the initial value is the carrier's central-frequency $\Omega f0$ from the initial sync component 740. $\sigma$in is the burst droop factor, and the initial value is "0". This default value data is supplied to the optimal parameter estimation component 800 as the initial parameters in the calculation to minimize the modulation precision $\epsilon$.

Next the total symbol demodulation component 500 is described.

Figure 6:
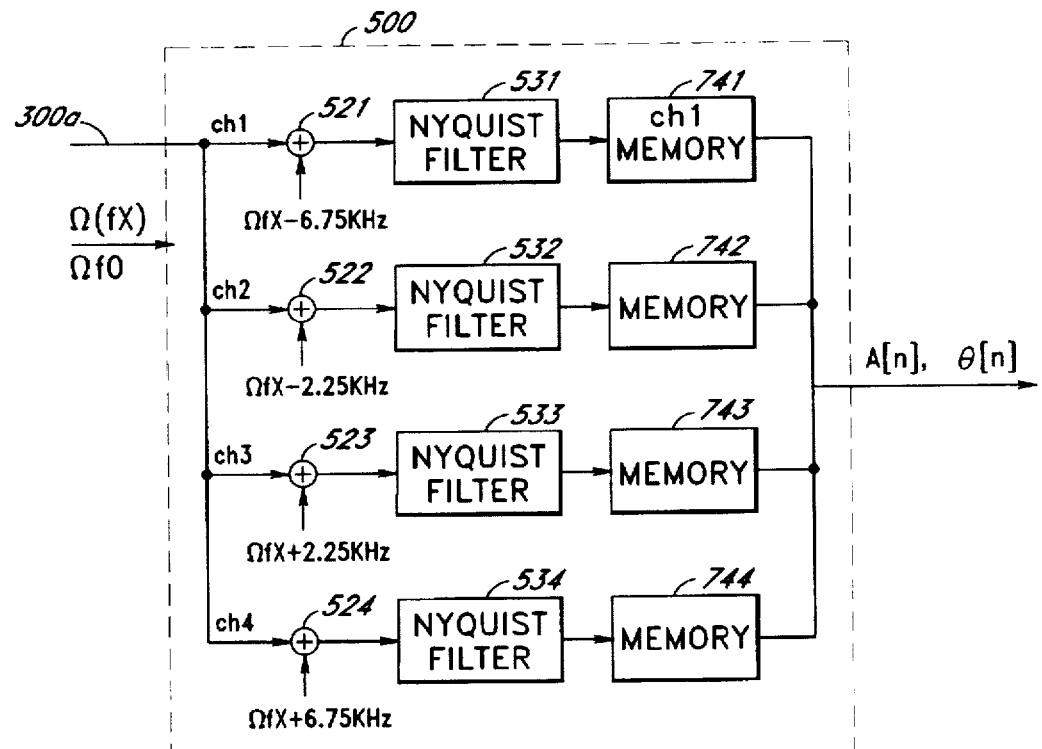
FIG. 6 shows the structural diagram of the complete symbol-demodulation component 500 for this invention.
Figure 7A:
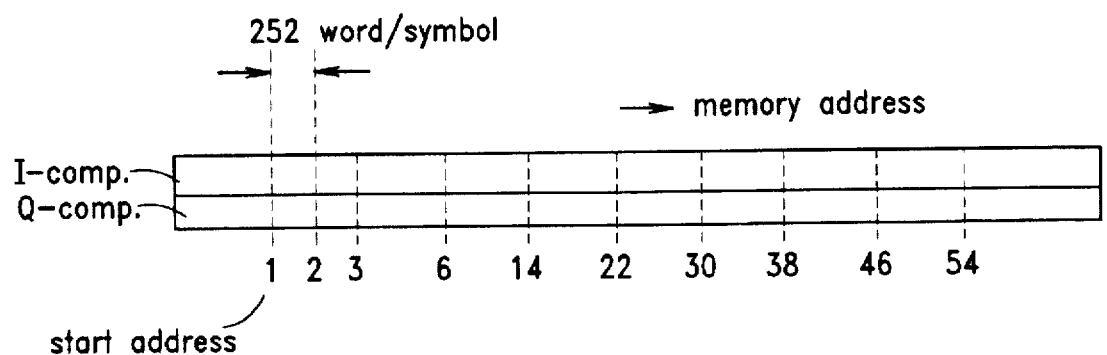
FIG. 7 (a) shows a diagram to describe the starting address and sync/pilot symbol (PS) addresses from the asynchronous replay memory 714.
Figure 7B:
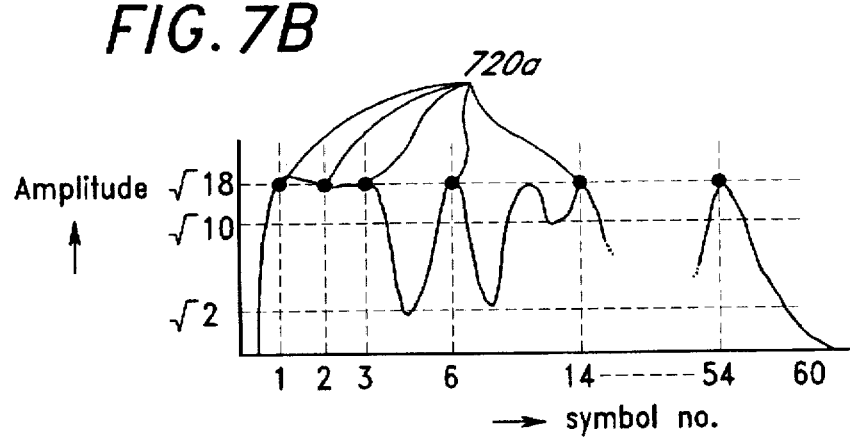
Figure 7C:
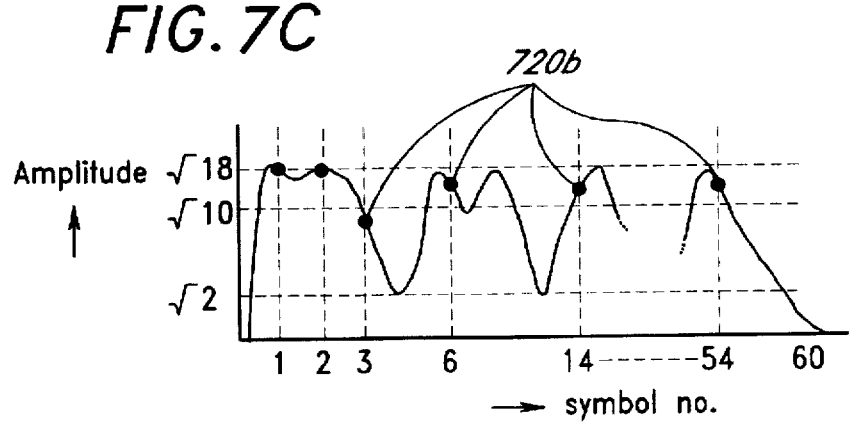

The structure of the total symbol-demodulation component 500 is comprised of a channel-one mixer 521, a channel-two mixer 522, channel-three mixer 523, channel-four mixer 524, root Nyquist filter 531–534, channel-demodulation memory 741, channel-two demodulation memory 742, channel-three demodulation memory 743, and channel-four demodulation memory 744, as shown in FIG. 6.

The total symbol-demodulation component 500 receives the slot starting address dly0 and demodulation frequency function $\Omega f(x)$ from the optimal parameter-estimation component 800. The IQ data 300a is read from the IQ storage memory 300. The amplitude A[n] and phase angle $\theta$[n] for all symbols of the four channels are demodulated, and stored into the demodulation memory 741–744. For the demodulation frequency function $\Omega f(x)$ given to each mixer, the carrier's central-frequency $\Omega f0$ from the initial sync component 740 is used for first-time execution.

From the second time or often, the demodulation-frequency function $\Omega f(x)$ from the optimal- parameter estimation component 800 is used for demodulation.

In the channel it is stored the amplitude A[n] and phase angle $\theta$[n] that were obtained from processing through the channel-one mixer 521 and route Nyquist filter 531 in the channel-one demodulation memory 741, as shown in FIG. 6.

Similarly, channel two stores the data in the channel-two demodulation memory 742 after demodulating using channel-two mixer 522 and root Nyquist filter 532. The channel three stores the data in the channel-three demodulation memory 743 after demodulating using channel-three mixer 523 and root Nyquist filter 533. The channel four stores the data in the channel-four demodulation memory 744 after demodulating using channel-four mixer 524 and root Nyquist filter 534.

The amplitude A[n] and phase angle $\theta$[n] data in the demodulation memory are used by the optimal-parameter estimation component 800, reference-data estimation component 600, and modulation-precision calculation component 900 for usage.

Next, the reference-data estimation component 600 is described.

Figure 12:
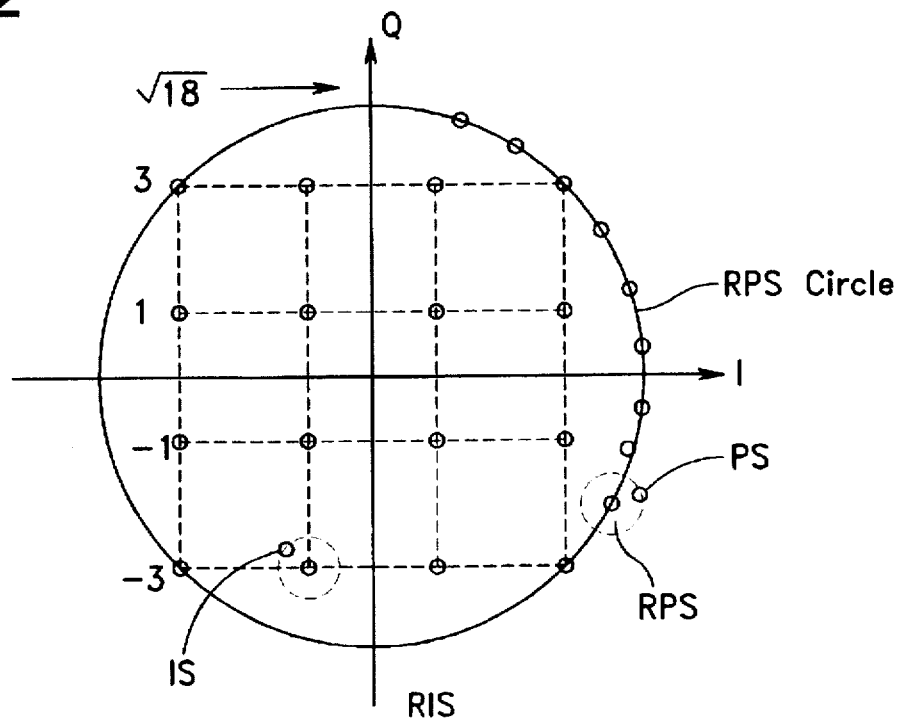
FIG. 12 is a diagram describing the 16 symbol points with the I and Q-components, and the sync/pilot symbols (PS) on the circumference.
Figure 13:
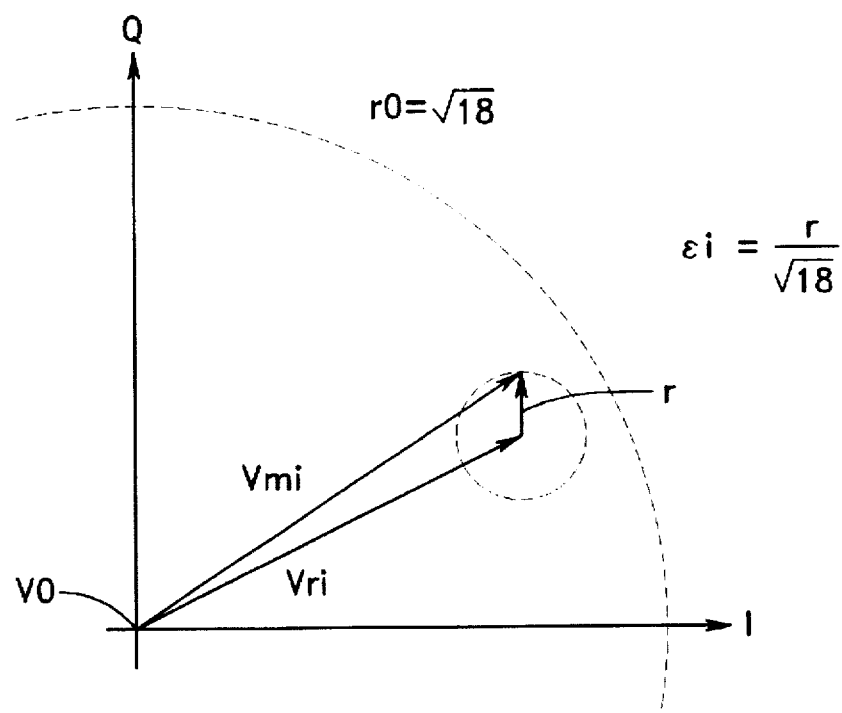
FIG. 13 is a diagram showing the observed vector modulation error.
Figure 14:
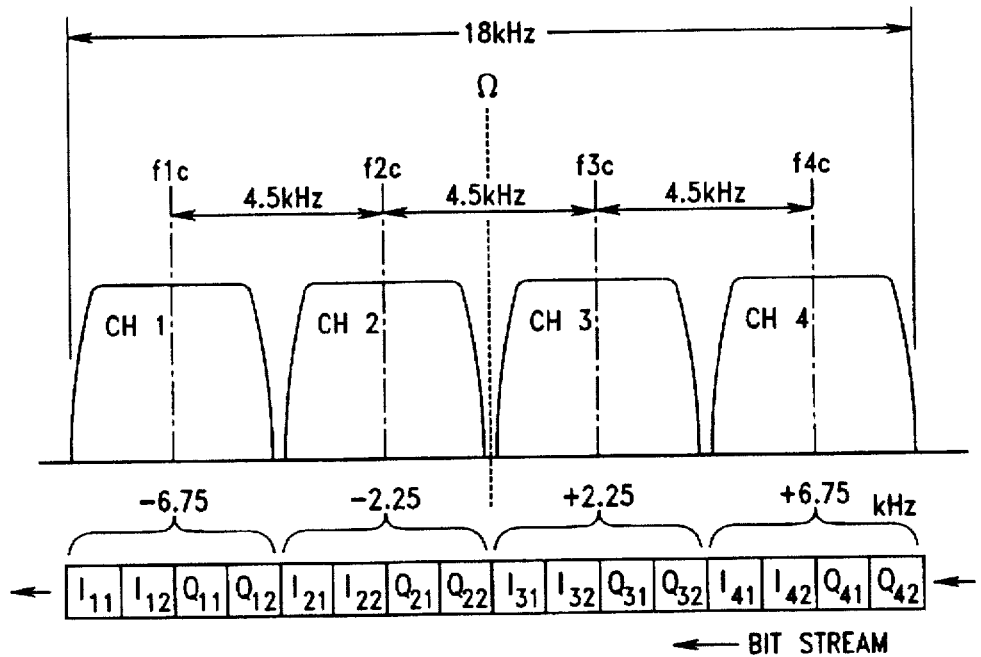
FIG. 14 is a diagram showing the four-channel subcarrier frequencies, the central frequency Q and the bit stream of I- and Q-components.
Figure 15:
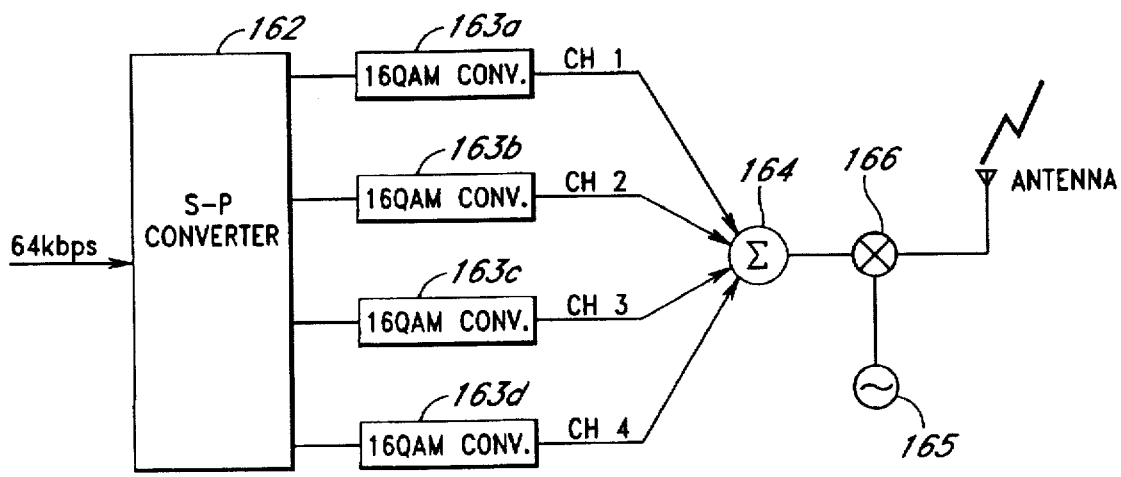
FIG. 15 is a transmission system diagram for the DMCA four-channel subcarrier.

The reference-data estimation component 600 uses the above-described amplitude A[n] and phase angle $\theta$[n] obtained from the total symbol-demodulation component 500, to determine the corresponding standard symbol points or to provide the points. For the information symbols (IS), the optimal value is determined from the standard 16 types of symbols (RIS) shown in FIG. 12. For the sync/pilot symbols (PS), the nominal value Ar[n]=$\sqrt{18}$ is provided, and the sync/pilot symbol (RPS) nominal phase value corresponding to each symbol number are provided for the $\theta$[n].

The reference symbol data Ar[n] and θr[n] obtained here are supplied to the optimal-parameter estimation component 800 and modulation-precision calculation component 900. The optimal calculation method for the information symbol (IS) is the maximum likelihood decision method known for modulation of multiple value modulation signals.

Next the optimal-parameter estimation component 800 is described.

To estimate the optimal parameter, the value is converged by performing multiple estimations. To converge the value to the minimum modulation-precision ε value, the convergence becomes possible by repeating the optimal-parameter estimations about three times.

For the first optimal-parameter estimation, the initial data Ain, θin, Bin, and σin from the initial-value extractor 402 are used. This initial data, the reference data Ar[n] and θr[n] from the reference-data estimation component 600, and demodulated data 741a–744a for all symbols for all channels from the total symbol-demodulation component 500 are received. The optimal parameters Ax, θx, Ω, Bx, and σx to minimize the modulation-precision ε are calculated using the formula (14), (15), and (21). Then, from the optimal parameter the demodulation-frequency function Ωf(x) is obtained, and this data is supplied to the total symbol-demodulation component 500.

Here the demodulation-frequency function Ωf(x) is the function for the 32 Ghz frequency signals with the parameters gain constant Ax, initial phase θx, carrier frequency Ωx, and burst droop factor σx.

To estimate the optimal parameters from the second time or after, the optimal parameters Ax, θx, Ωx, Bx, and σx obtained previously are used. This and the previous demodulation-frequency function Ωf(x) are supplied to the complete symbol-demodulation component 500. The new demodulated data A[n] and θ[n] is received, and they are supplied to the reference-data estimation component 600 again. The specified new reference data Ar[n] and θr[n] is received and the optimal parameters Ax, θx, Ωx, Bx, and σx with which to minimize the modulation precision ε are obtained from formulas (14), (15), and (21), as noted above. Also, the demodulation-frequency function Ωf(x) is calculated using these optimal parameters, and is supplied to the total symbol-demodulation component 500 again.

By repeating this estimation three times, normally the modulation precision value ε converges. As a result, the optimal parameters Ax, θx, Ωx, Bx, and σx used to minimize the modulation-precision ε are finally obtained. These optimal parameters are supplied to the next step, which is the modulation-precision calculation component 900.

The method to obtain the optimal parameters uses the linear recursion for the DQPSK modulation-signal evaluation device (Japanese Patent Application No. 12305/1993).

Next, the modulation-precision calculation component 900 is described.

The modulation-precision calculation component 900 receives the reference data Ar[n] and θr[n] specified by the above reference-data estimation component 600, and demodulation data A[n] and θ[n] for all symbols for all channels. The modulation- precision ε is calculated using the modulation-error calculation formula 31. Then, the error for each symbol is obtained and supplied to the output component 230. Here the symbols for the parameters in the formula 31 are V0=Bx, α=A0, and ψ=θx.

Also, if required the Δdly is added to the slot starting address dly0 as shown in FIG. 1. The slot starting positions are changed at the ±1 address positions, and these address positions are supplied to the total symbol-demodulation/ parameter-estimation component 400, and demodulation is performed again. Then the data which would minimize the modulation precision ε is selected, and can be used as the output data to the output component 230.

Lastly, the output component 230 is described.

The output component 230 converts the results of analytical data into the data in the output format for each type, and then the data is output externally. The overall measurement control is performed by the controller 280.

The output component 230 outputs the modulation-precision ε value externally. Also, if necessary the information data such as reference data Ar[n] and θr[n], and demodulation data A[n] and θ[n] for all symbols, can be processed and converted into each type of output-format data and can then be output. For example, these can be the screen-display format data such as the vector-error bandwidth, phase waveform, vector- error FFT, eye-pattern, constellation, etc.

The second embodiment for this invention is described below by referencing the figures.

Figure 9:
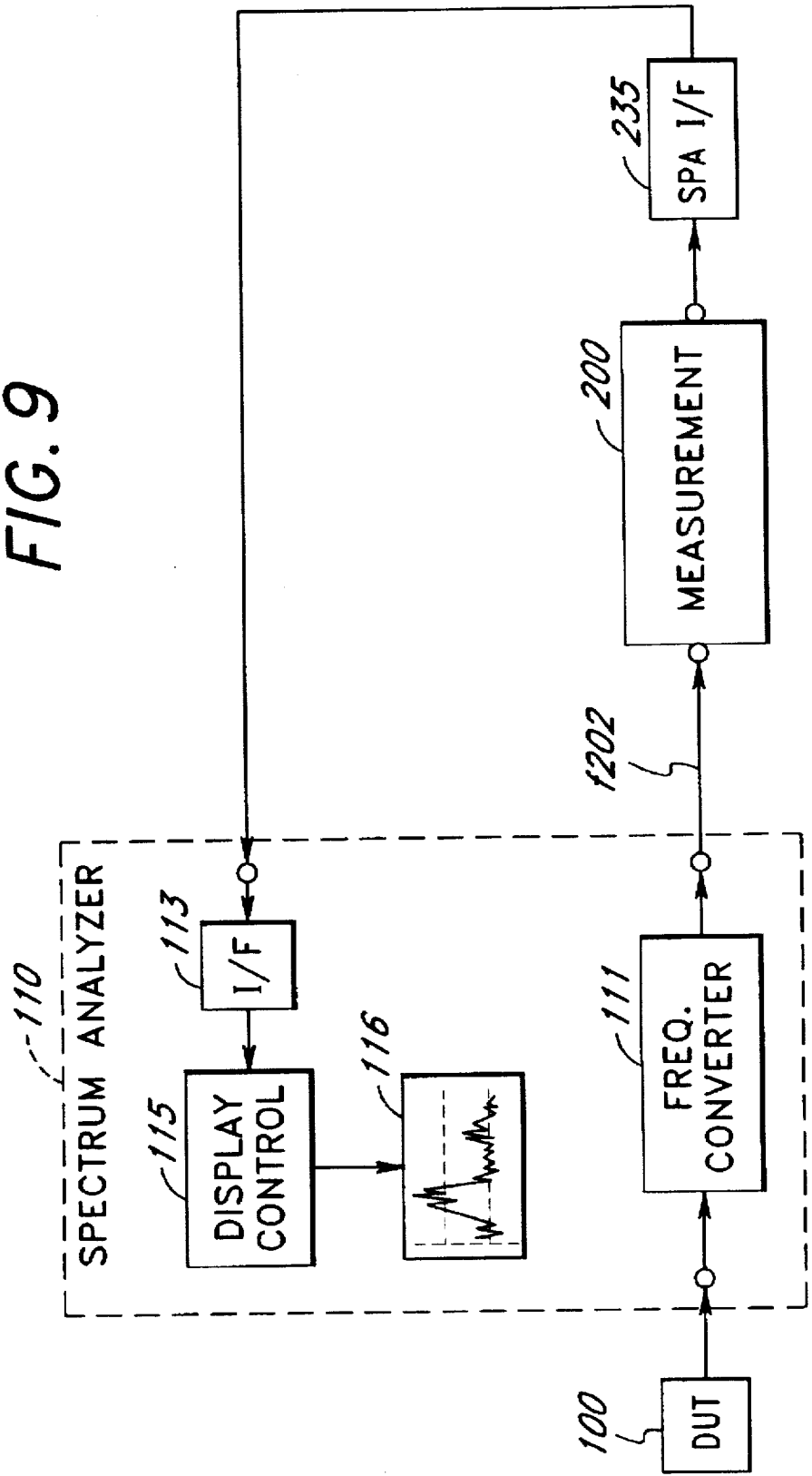
FIG. 9 shows the digital-modulation analysis device using the spectrum analyzer in the structure for the second embodiment of this invention.
Figure 10:
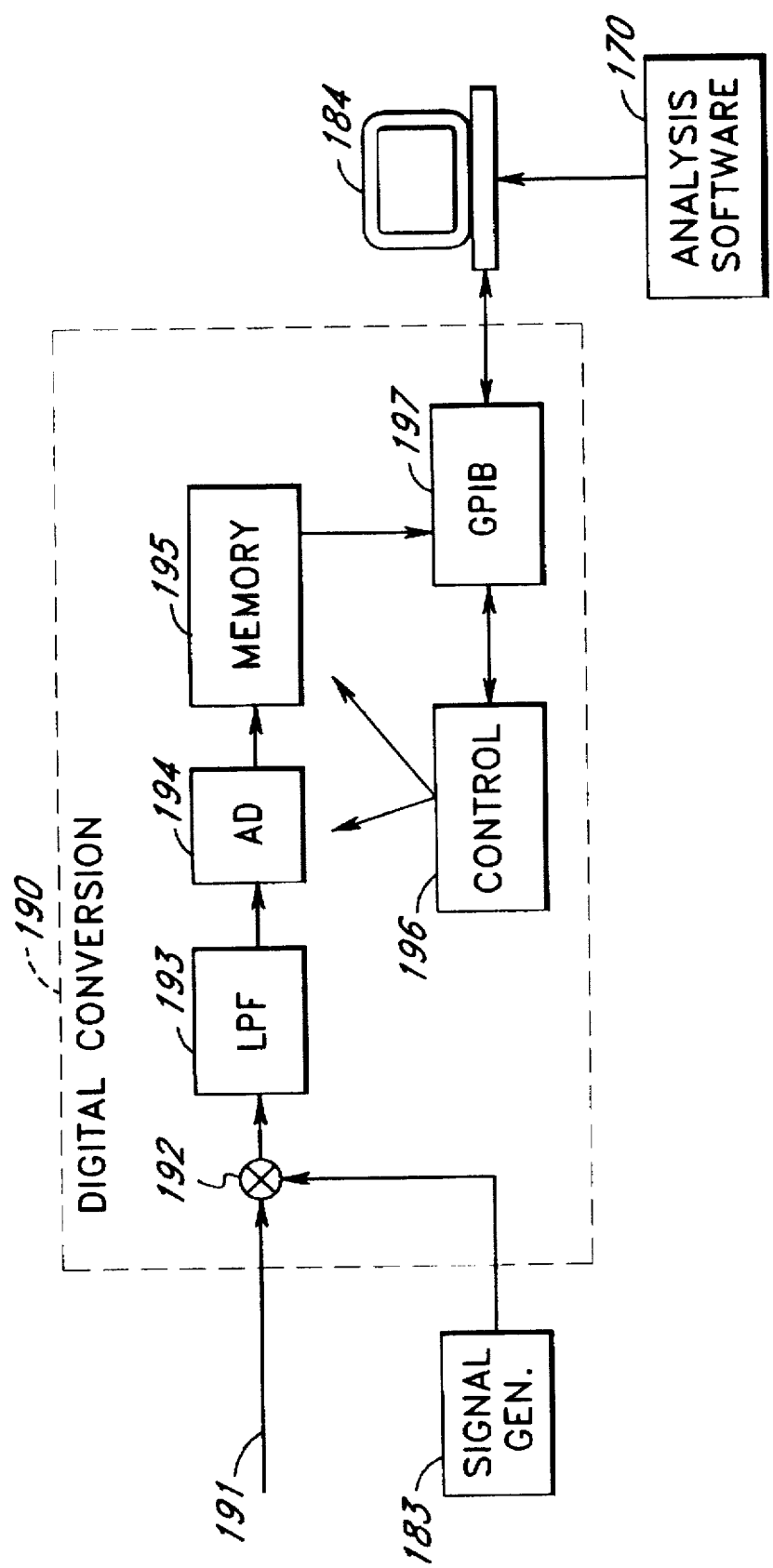
FIG. 10 is the structural diagram for the prior measurement system.
Figure 11:
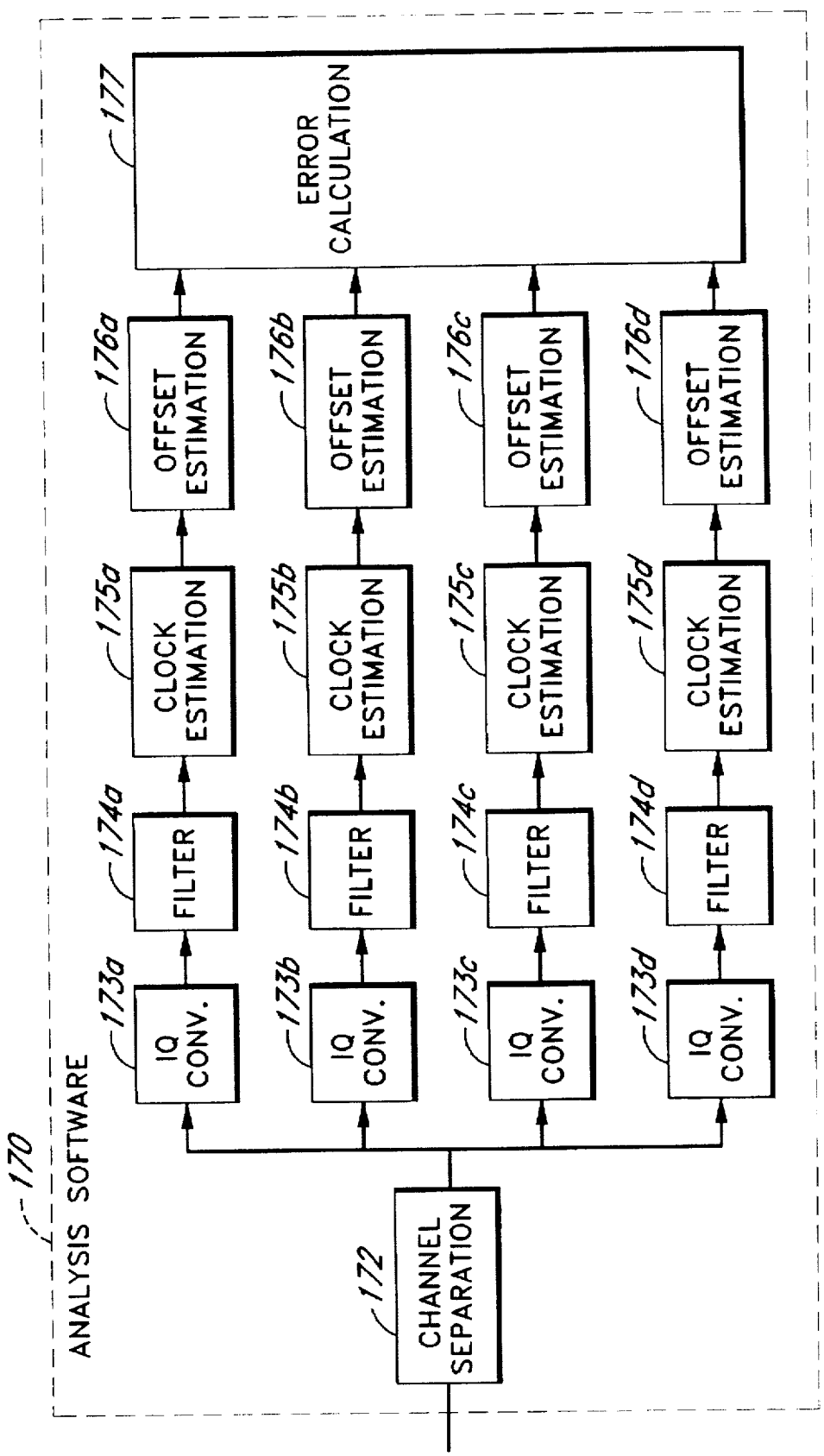
FIG. 11 is the structural block diagram of the analysis software 170 for the prior measurement system.

The second embodiment for this invention is realized by using the spectrum analyzer as the frequency converter 709 of FIG. 1 as well as a the display. The description is given below, using FIG. 9, as a reference.

The system structure is comprised of the spectrum analyzer 110, measurement component 200, SPA-I/F 235, external interface component 113, and the display controller 115.

In terms of connection, the DUT100 output terminal is connected to the input terminal of the spectrum analyzer 110 which is also connected to a frequency converter which performs the same function as that of the frequency converter 109 of FIG. 1. As is well known in the art, a spectrum analyzer includes a frequency converter at its input stage. The output terminal of the frequency converter 111 is connected to the input terminal of the measurement component 200. The output terminal of the measurement component 200 is connected to the input terminal of the SPA-I/F 235. The output terminal of the SPA-I/F 235 is connected to the output terminal of the spectrum analyzer 110 external interface 113. The output terminal of the external interface 113 is connected to the input terminal of the display controller 115.

The spectrum analyzer receives the signal from the DUT 100 at the input terminal of the spectrum analyzer. This is then down-converted to the frequency f202=21.42 MHz using the spectrum analyzer built-in frequency converter 111 function. These signals are output from the output terminal and supplied to the measurement component 200.

The measurement component 200 has the same structure as in the first embodiment of FIG. 1–6. The modulation precision ε data or other measurement data is output from the output component 230, and supplied to the SPA-I/F 235. The SPA-I/F 235 receives this data, and converts them into signals corresponding to the external interface component 113 of the spectrum analyzer 110. These signals are then supplied to the external interface component 113.

The external interface component 113 for the spectrum analyzer 110 receives the signals from the SPA-I/F 235, and supplies them to the display controller 115. The display controller 115 receives these signals, converts them to the format of each type for the DMCA modulation precision, and then displays them according to the display format on the display screen 116. By doing this, continuous measurements and display are performed.

In the description for the first embodiment, the method to detect the slot sync points of the slot sync detection component 720 is carried out by dividing the operation into two parts to obtain the slot sync points faster; i.e., the rough dispersion and detailed dispersion.

The dispersion can also be obtained directly at one time for all data, and this dispersion can be assumed as the minimal address value, in other words, as the slot starting address dly0.

This invention is structured as described above, the following effects are achieved.

The repeated number of optimal-parameter estimation used to converge the modulation-precision $\epsilon$ can be reduced in the following manner: Supply the sync IQ default value demodulation component 401 for all channels and default value extractor 402 to the optimal-parameter estimation component 800, and supply the optimal parameters Ain, θin, Ωin, Bin, and σin as the approximate initial values for the calculation. As a result, the cycle time for measurement analysis can be shortened.

Also, by obtaining the carrier's central-frequency Ωf0 with very few errors from the initial sync component 740, there is an improvement in calculation speed.

Also, the optimal parameter estimation calculation time can be shortened by providing the initial values Ain, θin, Ωin, Bin, and σin optimal parameters, and approximating for formulas (14), (15), (21), and (23).

Great advantages can be obtained by processing the massive data sampled by the AD converter 220 directly in the measurement component 200 and outputting the analyzed results.

For the second embodiment, advantages can be obtained by utilizing the standard frequency-conversion functions installed in the spectrum analyzer 110. By adding the display controller 115 and SPA-I/F 235, a simple and inexpensive and small-sized system can be structured.

What is claimed is:

1. A digital modulation analysis device for measurement of modulation precision of a digital MCA (Multi Channel Access) signal produced by a device under test (DUT) for a digital communication, comprising:

a frequency converter (109) which receives said signal from said DUT and converts said signal into a first intermediate frequency signal;

a sampling part (25) which receives said first intermediate frequency signal from said frequency converter (109) and converts said first intermediate frequency signal to a second intermediate-frequency signal whose frequency is lower than that of said first intermediate frequency to store said second intermediate frequency signal in a memory;

a Hilbert converter (310) which converts an incoming signal into I-component signals and Q-component signals through a quadrant-modulate detection process;

an initial synchronization part (740) which receives said I-component and said Q-component signals to determine a carrier's central-frequency (Ωf0) and a slot synchronization address (dly0);

a complete symbol-demodulation/parameter-estimation part (400) which receives information on said carrier's central-frequency (Ωf0) and a slot synchronization address (dly0) from said initial synchronization part (740) and said I-component and Q-component signals from said Hilbert converter (310) and determines optimal parameters (gain constant Ax, initial phase θx, carrier frequency Ωx, and burst droop factor σx) to minimize the modulation error $\epsilon$, said estimation part demodulating data for all symbols (vector value A[n] and phase angle θ[n] for symbol number n) and determining reference data for said all symbols (reference symbol vector value Ar[n]; and a modulation-precision calculation component (900) which receives said reference data from said complete symbol-demodulation/parameter-estimation component (400) and calculates modulation-precision $\epsilon$ data and/or modulation-error data for each symbol.

2. A digital modulation analysis device as defined in claim 1, wherein said frequency converter (109) is replace with a frequency converter (111) internally provided in a spectrum analyzer, and a display of said spectrum analyzer is used for displaying results of the modulation analysis by said digital modulation analysis device.

* * * * *